(12) United States Patent
Sawasaki et al.

(10) Patent No.: US 7,245,345 B2
(45) Date of Patent: *Jul. 17, 2007

(54) SUBSTRATE FOR LIQUID CRYSTAL DISPLAY DEVICE, MANUFACTURING METHOD OF THE SAME, AND LIQUID CRYSTAL DISPLAY DEVICE HAVING THE SAME

(75) Inventors: Manabu Sawasaki, Kawasaki (JP); Takashi Takagi, Kawasaki (JP); Tomonori Tanose, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/929,002

(22) Filed: Aug. 27, 2004

(65) Prior Publication Data

US 2005/0024567 A1   Feb. 3, 2005

Related U.S. Application Data

(62) Division of application No. 09/930,902, filed on Aug. 16, 2001, now Pat. No. 6,836,308.

(30) Foreign Application Priority Data

Nov. 27, 2000   (JP)   ............................. 2000-359728

(51) Int. Cl.
*G02F 1/1339* (2006.01)

(52) U.S. Cl. .................. 349/155; 349/106; 349/110

(58) Field of Classification Search ................ 349/110, 349/123, 128, 129, 155, 156, 157, 106, 178, 349/158; 430/7

See application file for complete search history.

(56) References Cited

U.S. PATENT DOCUMENTS

| | | | |
|---|---|---|---|
| 5,040,875 A | 8/1991 | Noguchi | |
| 5,434,690 A | 7/1995 | Hisatake et al. | 359/87 |
| 5,459,598 A | 10/1995 | Carrington | 359/81 |
| 5,815,232 A | 9/1998 | Miyazaki et al. | |
| 5,872,611 A | 2/1999 | Hirata et al. | 349/147 |
| 6,043,511 A | 3/2000 | Kim | |
| 6,067,144 A * | 5/2000 | Murouchi | 349/156 |
| 6,097,467 A | 8/2000 | Fujimaki et al. | |
| 6,281,960 B1 | 8/2001 | Kishimoto et al. | |
| 6,433,852 B1 | 8/2002 | Sonoda et al. | |
| 6,493,050 B1 | 12/2002 | Lien et al. | |

(Continued)

FOREIGN PATENT DOCUMENTS

EP   0 844 626   12/1998

(Continued)

*Primary Examiner*—Toan Ton
*Assistant Examiner*—Tai Duong
(74) *Attorney, Agent, or Firm*—Greer, Burns & Crain, Ltd.

(57) ABSTRACT

A liquid crystal display device capable of obtaining high luminance and good display characteristics, a substrate for such a liquid crystal display device, and a manufacturing method of such a substrate, are provided. A color filter substrate holds, together with an array substrate, a liquid crystal having negative dielectric anisotropy. Color filters are formed on a glass substrate and a common electrode is formed on the color filters. Protrusions and auxiliary protrusions for regulating the alignment of the liquid crystal are formed on the common electrode so as to have different sectional shapes.

12 Claims, 20 Drawing Sheets

U.S. PATENT DOCUMENTS

| | | |
|---|---|---|
| 6,522,379 B1 | 2/2003 | Ishihara et al. |
| 6,671,025 B1 | 12/2003 | Ikeda et al. |
| 6,724,452 B1 * | 4/2004 | Takeda et al. .............. 349/139 |
| 6,879,364 B1 | 4/2005 | Sasaki et al. |
| 7,136,140 B1 | 11/2006 | Inoue et al. |
| 7,167,224 B1 * | 1/2007 | Takeda et al. .............. 349/139 |
| 2002/0093617 A1 | 7/2002 | Matsuyama et al. |
| 2002/0159012 A1 | 10/2002 | Yamada ...................... 349/122 |

FOREIGN PATENT DOCUMENTS

| | | |
|---|---|---|
| JP | 7114020 | 5/1995 |
| JP | 10068955 | 3/1998 |
| JP | 11064837 | 3/1999 |
| JP | 11-242225 | 9/1999 |
| JP | 11264968 | 9/1999 |
| JP | 2000-155317 | 6/2000 |
| JP | 2001-83517 | 3/2001 |
| JP | 2002-107748 | 4/2002 |
| JP | 2002-169160 | 6/2002 |
| JP | 5289105 | 11/2005 |

\* cited by examiner

SUBSTRATE FOR LIQUID CRYSTAL DISPLAY DEVICE, MANUFACTURING METHOD OF THE SAME, AND LIQUID CRYSTAL DISPLAY DEVICE HAVING THE SAME

This is a divisional of application Ser. No. 09/930,902, filed Aug. 16, 2001 now U.S. Pat. No. 6,836,308.

BACKGROUND OF THE INVENTION

1. Field of the Invention

The present invention relates to a liquid crystal display device used in TV receivers, monitors, etc., a substrate for such a liquid crystal display device, and a manufacturing method of such a substrate.

2. Description of the Related Art

In general, a liquid crystal display device is composed of two substrates each having a transparent electrode(s) and a liquid crystal layer that is interposed between the two substrates. The display is controlled by driving the liquid crystal by applying voltages between the transparent electrodes and thereby changing the light transmittance. In recent years, the demand for liquid crystal display devices has increased and requirements for liquid crystal display devices have diversified. In particular, improvement in viewing angle characteristic and display quality is desired strongly and the vertically aligned (VA) liquid crystal display device is considered promising as a means for realizing such requirements.

The VA liquid crystal display device is characterized in that vertical alignment films are formed on the opposite surfaces of two substrates and a liquid crystal layer having negative dielectric anisotropy is interposed between the two substrates. In the VA liquid crystal display device, linear domain regulating means (protrusions or slits) are provided on the two substrates and domain division is performed by the domain regulating means. With these measures, the VA liquid crystal display device attains superior viewing angle characteristic and display quality.

At present, the interval (cell thickness) between the two substrates of a liquid crystal display device is kept by means of spherical or rod-shaped spacers made of plastics or glass. Usually, the spacers are sprayed on one of the two substrates in a spacer spraying process that is executed before attaching the substrates. Then, the two substrates are attached with each other and pressed against each other so that the cell thickness is kept close to the diameter of the spacers.

FIG. 35 is a plan view showing the configuration of a conventional VA liquid crystal display device, and specifically shows three pixels in which color filters of R (red), G (green), and B (blue) are arranged in order on a color filter (CF) substrate 106. A light shield film (BM) is formed on the CF substrate 106 so as to extend in the top-bottom direction and the right-left direction in FIG. 35 and thereby defines individual pixel regions. Protrusions 102 as linear alignment regulating structures are formed in each pixel region obliquely with respect to its end portions. On an array substrate (not shown in FIG. 35) that is opposed to the CF substrate 106, linear protrusions 103 are formed obliquely with respective to the sidelines of each pixel region so as to be deviated from the protrusions 102 by a half pitch. FIG. 35 does not show a storage capacitor bus line that traverses pixel regions at the center.

FIG. 36 is a sectional view of the VA liquid crystal display device taken along line C—C in FIG. 35, and shows a state of a liquid crystal LC when no voltage is applied. The array substrate 104 has pixel electrodes 110 that are formed on a glass substrate 108 in the respective pixel regions. The protrusions 103 are formed on the pixel electrodes 110. A vertical alignment film (not shown) is formed on the entire surfaces of the pixel electrodes 110 and the protrusions 103. On the other hand, the CF substrate 106 has a BM that is formed on a glass substrate 108. The color filters R, G, and B are formed in the respective pixel regions that are defined by the BM that is formed on the glass substrate 108. A common electrode 112 is formed on the color filters R, G, and B and the protrusions 102 are formed on the common electrode 112. A vertical alignment film (not shown) is formed on the entire surfaces of the common electrode 112 and the protrusions 102. The liquid crystal LC is sealed between the array substrate 104 and the CF substrate 106.

As shown in FIG. 36, liquid crystal molecules (indicated by cylinders in FIG. 36) are oriented approximately perpendicular to the substrates 104 and 106. The liquid crystal molecules in the regions where the protrusions 102 and 103 are formed are oriented approximately perpendicular to the surfaces of the protrusions 102 and 103 and are slightly inclined against the substrates 104 and 106. Since polarizers (not shown) are disposed outside the respective substrates 104 and 106 in the crossed Nichols state, black display is obtained when no voltage is applied.

FIG. 37 is a sectional view, similar to FIG. 36, of the VA liquid crystal display device taken along line C—C in FIG. 35, and shows a state of the liquid crystal LC when voltages are applied. Broken lines indicate electric field lines extending between the pixel electrode 110 and the common electrode 112. As shown in FIG. 37, when a voltage is applied between the pixel electrode 110 and the common electrode 112, the electric field is distorted near the protrusions 102 and 103 which are made of a dielectric, whereby the inclination direction of liquid crystal molecules having the negative dielectric anisotropy is regulated. Gradation display can be attained by controlling the inclination angle in accordance with the electric field strength.

Where the protrusions 102 and 103 are formed in a linear manner as shown in FIG. 35, when a voltage is applied, the liquid crystal molecules in the vicinity of the protrusions 102 and 103 fall in the two directions that are perpendicular to the extending direction of the protrusions 102 and 103, with the protrusions 102 and 103 being as boundaries. Since the liquid crystal molecules in the vicinity of the protrusions 102 and 103 are slightly inclined from the direction perpendicular to the two substrates 104 and 106 even when no voltage is applied, they fall quickly in response to electric field strength. The inclination directions of the liquid crystal molecules around the above liquid crystal molecules are determined in order according to the behavior of the above liquid crystal molecules, and the liquid crystal molecules around the above liquid crystal molecules fall in accordance with the electric field strength. In this manner, the domain division is realized in which the protrusions 102 and 103 as the alignment regulating structures serve as boundaries.

Incidentally, FIGS. 36 and 37 do not show spacers that determine the cell thickness. How spacers are arranged will be described with reference to FIG. 38, which is a sectional view taken along line A—A in FIG. 35. Together with the liquid crystal LC, spacers 114 for maintaining the cell thickness between the array substrate 104 and the CF substrate 106 are sealed between the two substrates 104 and 106.

In the VA liquid crystal display device shown in FIG. 38, the protrusions 102 and 103 are formed on the two substrates 104 and 106. Therefore, the cell thickness is determined in one case by spherical spacers 114 that are placed on a protrusion 102 or in another case by spacers 114 that are not placed on any protrusion 102. As such, it is difficult to obtain a uniform cell thickness distribution. To obtain a uniform cell thickness distribution, it is preferable that the number of asperities on the surface of the two substrates 104 and 106 is as small as possible.

FIG. 39 is a sectional view, taken along line C—C in FIG. 35, of a VA liquid crystal display device that is obtained by replacing the protrusions 103 on the array substrate 104 with slits 118 in the VA liquid crystal display device of FIG. 35, and shows a state of the liquid crystal LC when a voltage is applied. As shown in FIG. 39, in the regions where the slits 118 are formed, approximately the same electric field lines are formed as in the regions in FIG. 37 where the protrusions 103 are formed. In this manner, domain division in which the protrusions 102 and the slits 118 serve as boundaries is realized.

FIG. 40 is a sectional view taken along line A—A in FIG. 35, of the VA liquid crystal display device that is obtained by replacing the protrusions 103 on the array substrate 104 with the slits 118 in the VA liquid crystal display device of FIG. 35, and shows a state of the liquid crystal LC when a voltage is applied. As shown in FIG. 40, the liquid crystal molecules in end portions (circled in FIG. 40) of the pixel electrode 110 fall in the different direction than nearby liquid crystal molecules. The light transmittance is low in these alignment defective regions and the presence of these regions is a factor of lowering the luminance in white display.

FIG. 41 is a plan view showing the configuration of still another conventional VA liquid crystal display device, and specifically shows three pixels of R, G, and B on the CF substrate 106. The components in FIG. 41 having the same functions as the corresponding components in FIG. 35 are given the same reference symbols as the latter and will not be described. The liquid crystal display device shown in FIG. 41 is characterized in that slits 118 are formed in place of the protrusions 103 on the array substrate 104, and that auxiliary protrusions 116 that branch off the protrusions 102 and extend along the end portions of each pixel region that extend in the top-bottom direction in FIG. 41 are formed on the CF substrate 106. Although not shown in FIG. 41, the slits 118 have connecting portions, whereby the divided portions of the pixel electrode of each pixel are electrically connected to each other. Together with the protrusions 102, the auxiliary protrusions 116 function as alignment regulating structures. The protrusions 102 determine the viewing angle characteristic of the liquid crystal display device and the auxiliary protrusions 116 control liquid crystal alignment defects due to electric fields that develop in the vicinity of the end portions of each pixel electrode 110. FIG. 41 does not show a storage capacitor bus line that traverses pixel regions at the center.

FIG. 42 is a sectional view of the VA liquid crystal display device taken along line D—D in FIG. 41. In the liquid crystal display device shown in FIG. 42, the slits 118 is formed on the array substrate 104 in place of the protrusions 103 and the auxiliary protrusions 116 are formed on the CF substrate 106. As shown in FIG. 42, the auxiliary protrusions 116 eliminate the alignment defects that occur in the end portions of each pixel electrode 110 (circled in FIG. 40).

Incidentally, the protrusions 102 and the auxiliary protrusions 116 are different in the necessary alignment regulating force. The alignment regulating force of the protrusions 102 is desired to be strong because it determines the liquid crystal alignment direction when voltage is applied. On the other hand, the alignment regulating force of the auxiliary protrusions 116 is desired to be well balanced with the electric fields that develop in the vicinity of the end portions of each pixel electrode 110. FIGS. 43A to 43C show how liquid crystal molecules are oriented in an end portion of each pixel electrode 110. The protrusion 102 is formed on the CF substrate 106 obliquely with respect to the end portion of the pixel electrode 110 and the slit 118 is formed on the array substrate 104 obliquely with respect to the end portion of the pixel electrode 110. The auxiliary protrusion 116 is further formed on the CF substrate 106 so as to branch off the protrusion 102 and extend along the end portion of the pixel electrode 110 that extends in the top-bottom direction in FIGS. 43A to 43C.

FIG. 43A shows a state that the alignment regulating force of the auxiliary protrusion 116 is balanced with the electric field that develops in the vicinity of the end portion of the pixel electrode 110. Because of the alignment regulating force of the auxiliary protrusion 116, the liquid crystal molecules in the end portion of the pixel electrode 110 are oriented approximately parallel with the other liquid crystal molecules, whereby the light transmittance is increased and no reduction in luminance occurs. FIG. 43B shows a state that the alignment regulating force of the auxiliary protrusion 116 is weak. The alignment defect of the liquid crystal molecules in the end portion of the pixel electrode 110 is not controlled sufficiently, and the liquid crystal molecules in the end portion of the pixel electrode 110 are not oriented parallel with the other liquid crystal molecules. No improvement is attained in the problem of reduction in luminance in a region that is hatched in FIG. 43B. FIG. 43C shows a state that the alignment regulating force of the auxiliary protrusion 116 is too strong. Because of the alignment regulation by the auxiliary protrusion 116, the liquid crystal molecules in the end portion of the pixel electrode 110 are oriented approximately perpendicular to the auxiliary protrusion 116. In this state, the alignment direction of the liquid crystal molecules approximately coincides with the absorption axis of the polarizer and hence no improvement is attained in the problem of reduction in luminance in a region that is hatched in FIG. 43C.

In general, the liquid crystal alignment regulating force of an alignment regulating protrusion becomes stronger as it is made higher or wider. That is, to obtain a stable liquid crystal alignment state, it is desirable to form high and wide alignment regulating protrusions. However, if high and wide alignment regulating protrusions are formed, the degree of undulation of the substrate surfaces becomes high and it becomes difficult to obtain a uniform cell thickness by spraying spacers. Therefore, the conventional VA liquid crystal display device has a problem that it is difficult to obtain a uniform cell thickness distribution while the alignment regulating forces of a plurality of alignment regulating protrusions formed on the substrates are optimized in the respective prescribed regions.

SUMMARY OF THE INVENTION

An object of the present invention is to provide a liquid crystal display device capable of obtaining high luminance and good display characteristics, a substrate for such a liquid crystal display device, and a manufacturing method of such a substrate.

The above object is attained by a substrate for a liquid crystal display device, comprising an insulating substrate for holding a liquid crystal having negative dielectric anisotropy between itself and an opposite substrate; and a plurality of alignment regulating protrusions formed on the insulating substrate, for regulating the alignment of the liquid crystal, the alignment regulating protrusions including those having sectional shapes that are different from each other.

The above object is also attained by a manufacturing method of a substrate for a liquid crystal display device, comprising the steps of forming a plurality of thermoplastic resin layers having different line widths by applying a thermoplastic resin on an insulating substrate and patterning it; and forming a plurality of alignment regulating protrusions having different heights simultaneously by heat-treating the thermoplastic resin layers.

Further, the above object is attained by a substrate for a liquid crystal display device, comprising an insulating substrate for holding a liquid crystal between itself and an opposite substrate; a plurality of resin spacers formed on the insulating substrate, for regulating a cell thickness; and a plurality of dummy patterns made of the same material as the resin spacers are formed on the insulating substrate in such a manner that top surfaces of the dummy patterns are lower than those of the resin spacers, the dummy spacers serving to check whether the resin spacers have thickness unevenness.

DESCRIPTION OF THE PREFERRED EMBODIMENTS

First Basic Embodiment

Figure 1:
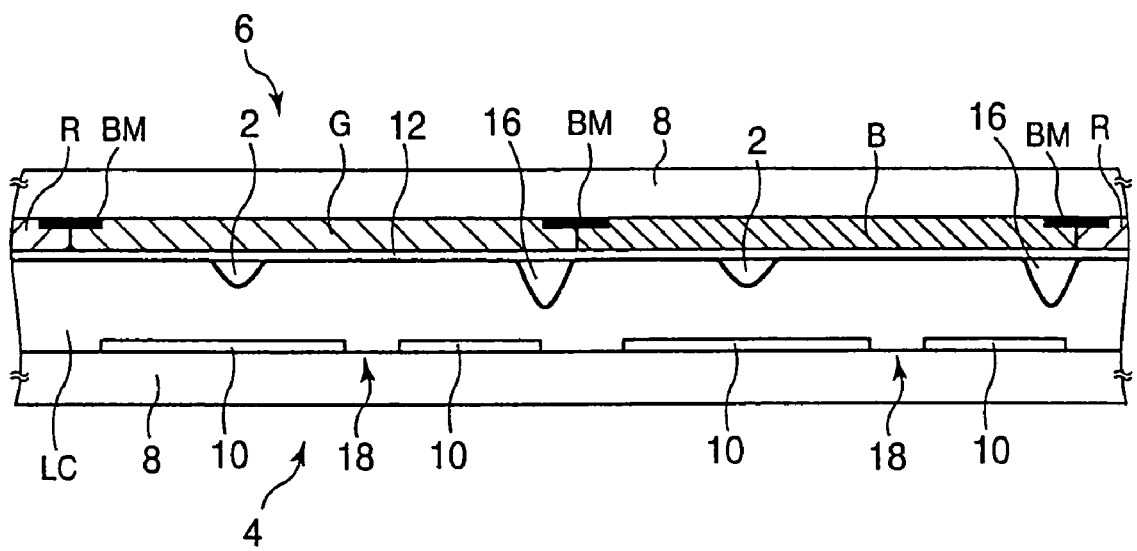
FIG. 1 is a sectional view showing the configuration of a substrate for a liquid crystal display device according to a first basic embodiment of the present invention.
Figure 2:
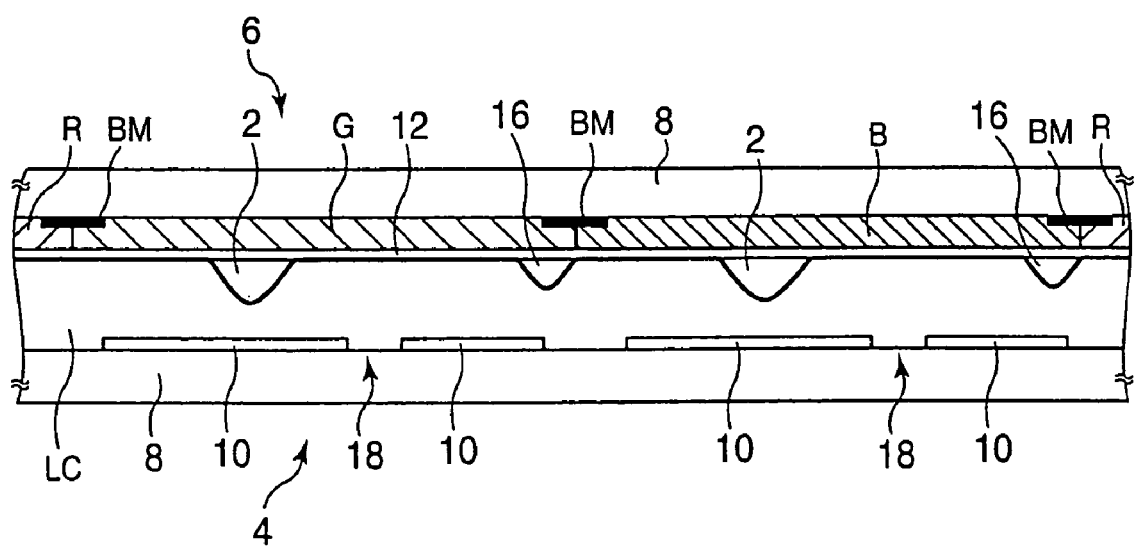
FIG. 2 is a sectional view showing the configuration of another substrate for a liquid crystal display device according to the first basic embodiment of the present invention.

A substrate for a liquid crystal display device, manufacturing method of the substrate, and a liquid crystal display device having the substrate according to a first basic embodiment of the present invention will be described with reference to FIGS. 1 to 23. First, the configurations of substrates for a liquid crystal display device according to the first basic embodiment will be described with reference to FIGS. 1 and 2. Both of FIGS. 1 and 2 are a sectional view taken along line F-F in FIG. 4, that is, taken in a direction that is inclined from the extending directions of protrusions 2 and auxiliary protrusions 16. However, in FIGS. 1 and 2, the sectional shapes of the protrusions 2 and the auxiliary protrusions 16 are ones taken in directions approximately perpendicular to their respective extending directions. In the following description, the term "sectional shape" of a protrusion 2 or an auxiliary protrusion 16 will mean a sectional shape taken approximately perpendicular to its extending direction irrespective of the direction along which a sectional view is taken.

FIG. 1 is a sectional view showing a liquid crystal panel in which a CF substrate 6 is a substrate for a liquid crystal display device according to the first basic embodiment and a liquid crystal LC having negative dielectric anisotropy is sealed between the CF substrate 6 and an opposite array substrate 4. The array substrate 4 has pixel electrodes 10 that are formed on a glass substrate 8 as an insulating substrate in respective pixel regions. Each pixel electrode 10 has slits 18. A vertical alignment film (not shown) is formed on the pixel electrodes 10 and the slits 18 over the entire surface.

The CF substrate 6 that is the substrate for a liquid crystal display device according to this basic embodiment has a BM made of low-reflectance Cr, for example, that is formed on a glass substrate 8 as an insulating substrate. Color filters R, G, and B are formed in the respective pixel regions that are defined by the BM that is formed on the glass substrate 8. A common electrode 12 is formed on the color filters R, G, and B over the entire surface. Protrusions 2 and auxiliary protrusions 16 as alignment regulating structures for regulating the alignment of the liquid crystal LC are formed on the common electrode 12. A vertical alignment film (not shown) is formed on the common electrode 12, the protrusions 2, and the auxiliary protrusions 16 over the entire surfaces.

Figure 43A:
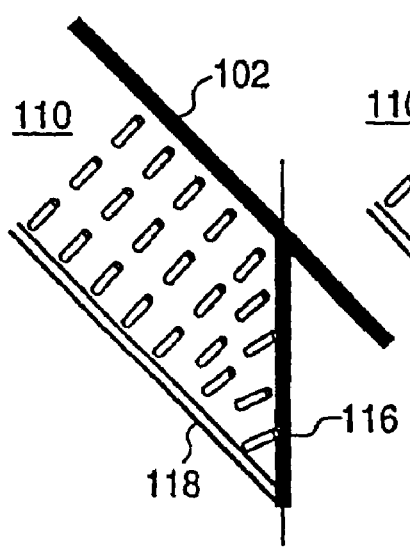
FIGS. 43A to 43C illustrates a problem of the conventional substrate for the liquid crystal display device and the liquid crystal display device using the substrate.
Figure 43B:
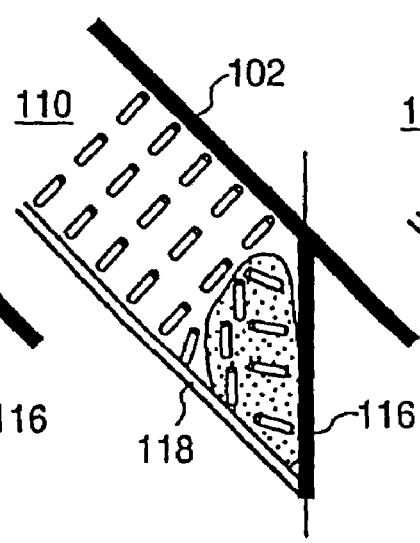

The protrusions 2 and the auxiliary protrusions 16 that are formed on CF substrate 6 of FIG. 1 have different sectional shapes. Specifically, as shown in FIG. 1, as seen from their sectional shapes, the auxiliary protrusions 16 are relatively higher than the protrusions 2. This can make the alignment regulating force of the auxiliary protrusions 16 relatively strong. More specifically, where the alignment regulating force of the auxiliary protrusions 116 is weak as shown in FIG. 43B, the protrusions 2 and the auxiliary protrusions 16 having the sectional shapes shown in FIG. 1 are formed, whereby the alignment regulating force of the auxiliary protrusions 116 is balanced with the electric field developing in the end portions of each pixel electrode 110 as shown in FIG. 43A and the liquid crystal molecules come to be aligned in the prescribed direction in a continuous manner.

FIG. 2 is a sectional view showing a liquid crystal panel in which another CF substrate 6 is a substrate for a liquid crystal display device according to the first basic embodiment and a liquid crystal LC having negative dielectric anisotropy is sealed between the CF substrate 6 and an opposite array substrate 4. The components in FIG. 2 having the same functions as the corresponding components in FIG. 1 are given the same reference symbols as the latter and will not be described. The protrusions 2 and the auxiliary protrusions 16 that are formed on the CF substrate 6 of FIG. 2 have different sectional shapes. Specifically, as shown in FIG. 2, the sectional shape of the protrusions 2 is higher and wider than that of the auxiliary protrusions 16. This example is effective in a case where the alignment regulating force of the protrusions 2 become relatively weak if the alignment regulating force of the auxiliary protrusions 16 is balanced with the electric field developing in the end portions of each pixel electrode 10. Using the CF substrate 6 shown in FIG. 2 makes it possible to give the protrusions 2 sufficiently strong alignment regulating force while keeping the alignment regulating force of the auxiliary protrusions 16 at a prescribed level.

The substrate for a liquid crystal display device and the liquid crystal display device having the substrate according to the first basic embodiment will be described in more detail by using Embodiments 1-1 to 1-3.

Embodiment 1-1

Figure 3:
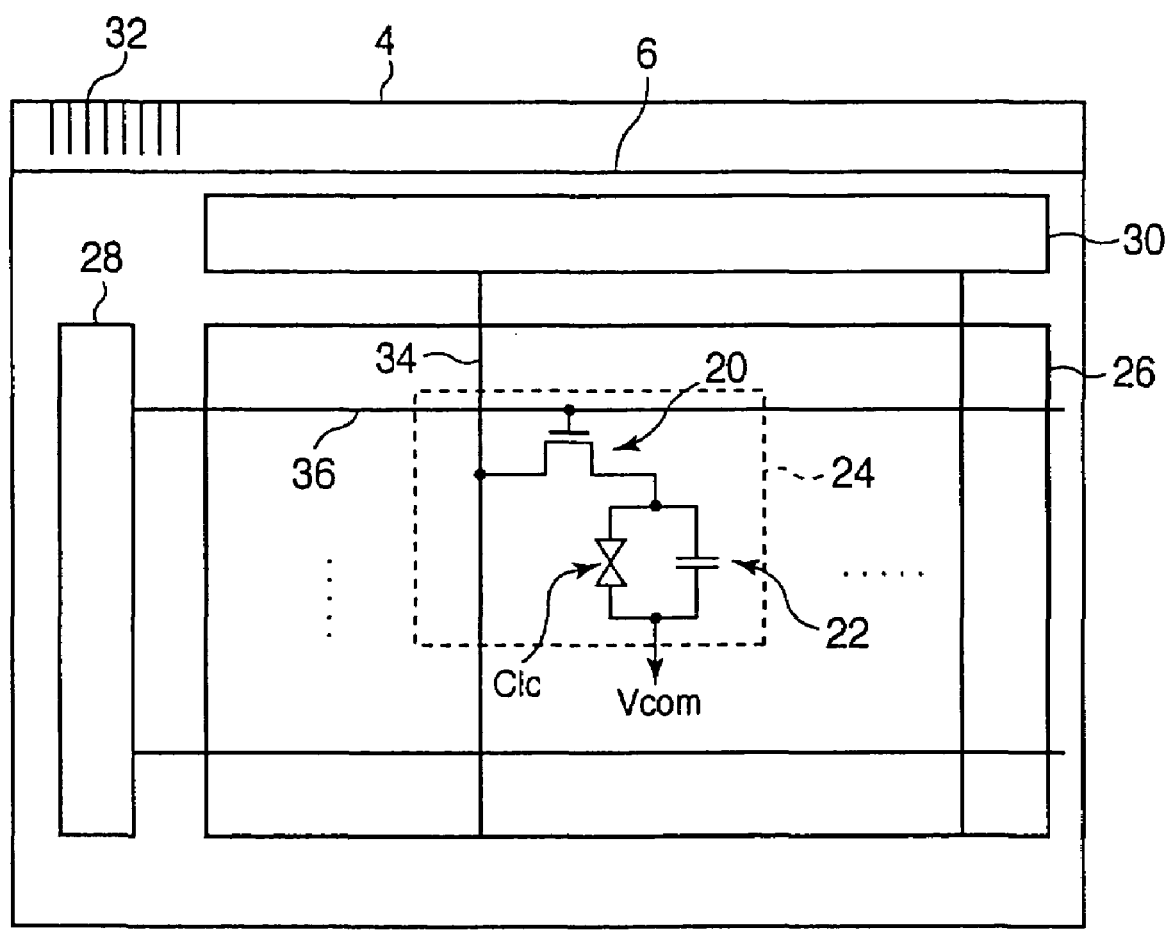
FIG. 3 shows the entire configuration of a liquid crystal display device according to Embodiment 1-1 of the first basic embodiment of the invention.

A substrate for a liquid crystal display device, manufacturing method of the substrate, and a liquid crystal display device having the substrate according to this embodiment will be described below with reference to FIGS. 3 to 12. FIG. 3 shows the entire configuration of the liquid crystal display device according to this embodiment. A display area 26 in which a number of pixel regions 24 each having a TFT 20, a storage capacitor 22 and a pixel electrode (not shown in FIG. 3) that is a transparent conductive film made of, for example, indium tin oxide (ITO) are arranged in a matrix form is defined on an array substrate 4. In FIG. 3, an equivalent circuit corresponding to one pixel of the liquid crystal display device is shown in the pixel region 24. A gate bus line driving circuit 28 is disposed on the left of the display area 26 and a drain bus line driving circuit 30 is disposed above the display area 26 (see FIG. 3). Input terminals 32 for receiving a dot clock signal, a horizontal sync signal (Hsync), a vertical sync signal (Vsync), and RGB data from the system side are provided at a panel top portion (see FIG. 3).

The array substrate 4 is opposed to and attached with a CF substrate 6 via a sealing agent (not shown). A liquid crystal LC having negative dielectric anisotropy is sealed in a cell gap formed between the array substrate 4 and the CF substrate 6. Each pixel electrode on the array substrate 4, the common electrode on the CF substrate 6, and the liquid crystal LC interposed therebetween form a liquid crystal capacitor Clc. On the other hand, a display electrode and a storage capacitor bus line that are formed in the array substrate 4 side via an insulating film (not shown) interposed therebetween form a storage capacitor 22.

In the display area 26, a plurality of drain bus lines 34 extending in the top-bottom direction in FIG. 3 are arranged parallel with each other in the right-left direction in FIG. 3. The individual drain bus lines 34 are connected to the drain bus line driving circuit 30, and prescribed gradation voltages are applied to the respective drain bus lines 34.

A plurality of gate bus lines 36 extending in a direction approximately perpendicular to the drain bus lines 34 are arranged parallel with each other in the top-bottom direction in FIG. 3. The individual gate bus lines 36 are connected to the gate bus line driving circuit 28. The gate bus line driving circuit 28 outputs gate pulses sequentially to the gate bus lines 36 in synchronism with bit outputs that are output from a built-in shift register.

When a gate pulse is output from the gate bus line driving circuit 28 to one of the gate bus lines 36, the plurality of TFTs 20 connected to the one gate bus line 36 are turned on. As a result, gradation voltages being applied from the drain bus line driving circuit 30 to the drain bus lines 34 are applied to the respective pixel electrodes.

Figure 4:
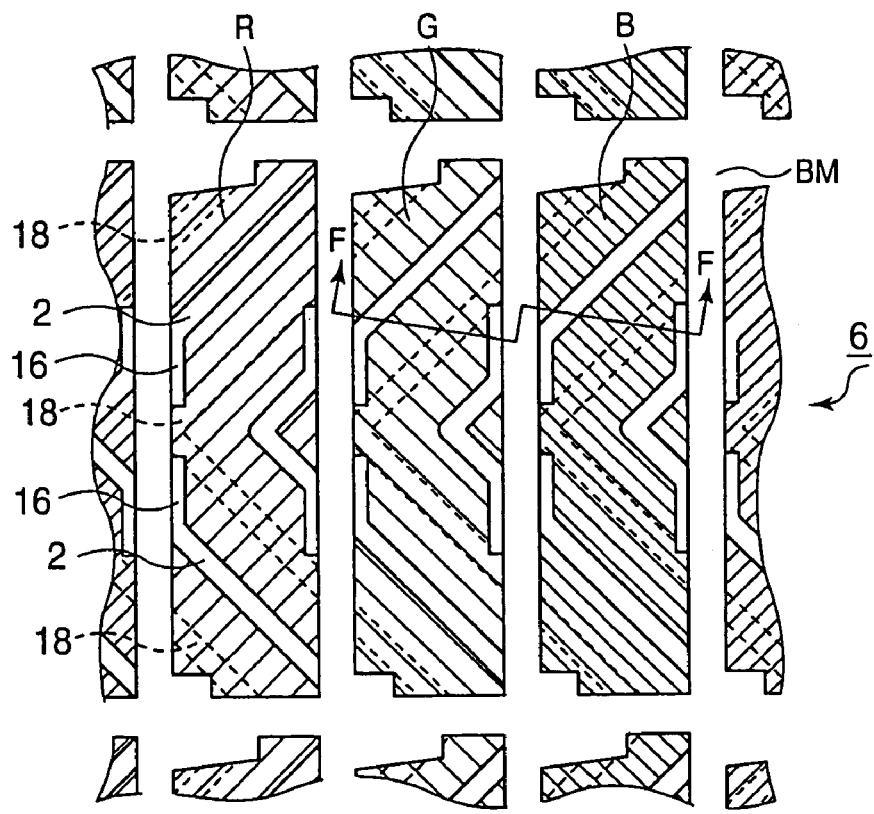
FIG. 4 is a plan view showing the configuration of a substrate for a liquid crystal display device and the configuration of a liquid crystal display device using it according to Embodiment 1-1 of the first basic embodiment of the invention.
Figure 5:
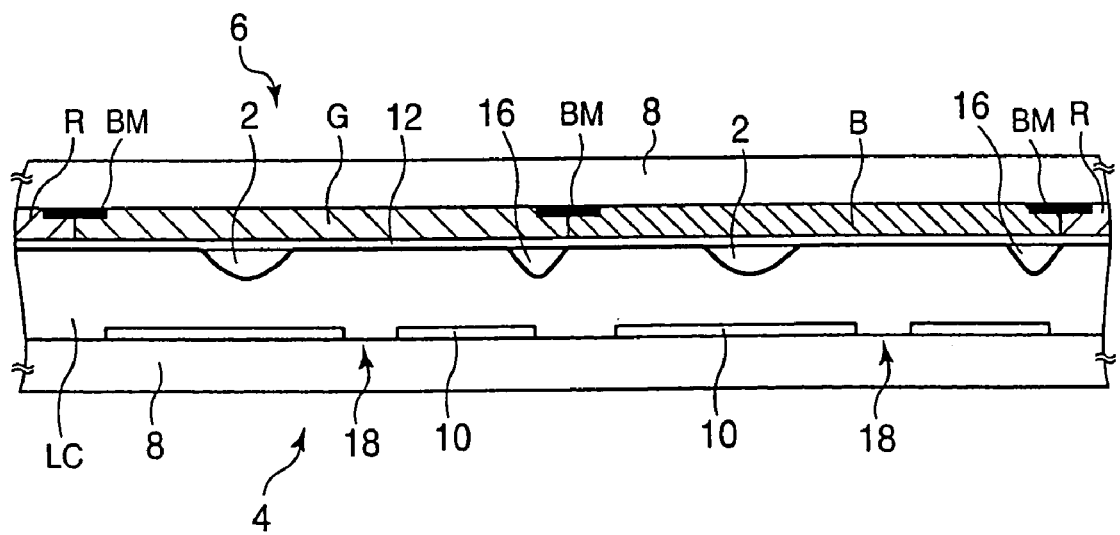
FIG. 5 is a sectional view showing the configurations of the substrate for the liquid crystal display device and the liquid crystal display device using it, according to Embodiment 1-1 of the first basic embodiment of the invention.

FIG. 4 is a plan view showing the configurations of the CF substrate 6 as the substrate for a liquid crystal display device according to this embodiment and, more specifically, shows three pixels of R, G, and B on the CF substrate 6. FIG. 5 is a sectional view of the substrate for a liquid crystal display device taken along line F—F in FIG. 4. The components in FIGS. 4 and 5 having the corresponding components in FIG. 1 are given the same reference symbols as the latter and will not be described. As shown in FIG. 4, a BM made of low-reflectance Cr, for example, is formed on the CF substrate 6 so as to extend in the top-bottom direction and the right-left direction in FIG. 4 and thereby defines the individual pixel regions. On the array substrate (not shown in FIG. 4) that is opposed to the CF substrate 6, color filters R, G, and B are aligned in the respective pixel regions, more specifically, in such regions as to be opposed to the respective pixel electrodes (not shown in FIG. 4). Linear protrusions 2 as alignment regulating structures are formed obliquely with respect to the end portions of the pixel electrodes on the common electrode 12 that is formed on the color filters over the entire surface. As shown in FIG. 5, the sectional shape of each protrusion 2 is a mountain shape having a width of 1.5 μm and a height of 1.1 μm, for example.

As shown in FIG. 4, linear auxiliary protrusions 16 as alignment regulating structures are formed so as to branch off the protrusions 2 and extend along the top-bottom side lines of the pixel regions. As shown in FIG. 5, the sectional shape of each auxiliary protrusion 16 is 11 μm in width and 1.1 μm in height and hence is different from that of each protrusion 2. Slits 18 are formed obliquely with respect to the end portions of the pixel electrodes on the pixel electrode on the array substrate that is opposed to the CF substrate 6. Although not shown in FIGS. 4 and 5, the slits 18 have connecting portions, whereby the divided portions of the pixel electrode of each pixel are electrically connected to each other. The protrusions 2 determine the viewing angle characteristic of the liquid crystal display device and the auxiliary protrusions 16 control liquid crystal alignment defects that are caused by electric fields developing in the end portions of each pixel electrode. FIG. 4 does not show a storage capacitor bus line that traverses pixel regions at the center.

In this embodiment, the sectional shape of the protrusions 2 is wider than that of the auxiliary protrusions 16. Therefore, the alignment regulating force of the protrusions 2 can be increased without increasing that of the auxiliary protrusions 16 unduly in the end portions of each pixel electrode 10 and hence a superior viewing angle characteristic can be realized. Further, by making the sectional shape of only the protrusions 2 wide, increased in the relative area of all the protrusions on the substrate surface is suppressed and the flatness can be increased, which makes it possible to obtain a uniform cell thickness distribution when spacers are sprayed. That is, in the VA liquid crystal display device according to this embodiment, a uniform cell thickness distribution can be obtained over the entire substrate display area while the alignment regulating force of a plurality of alignment regulating protrusions formed on the substrate is optimized in each prescribed region, whereby unevenness in a displayed image is less conspicuous and the reliability is increased. Therefore, a high-yield liquid crystal display device that exhibits high luminance and superior display characteristics that are free of color variations and viewing angle-dependent variations can be realized.

Figure 6:
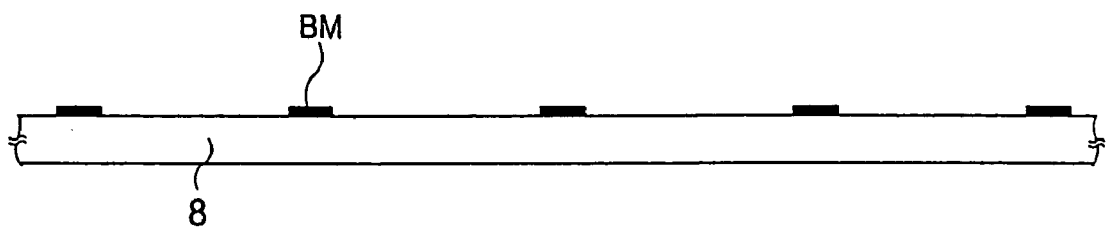
FIGS. 6 to 12 are sectional views showing a manufacturing process of the substrate for a liquid crystal display device according to Embodiment 1-1 of the first basic embodiment of the invention.

Next, a manufacturing method of the CF substrate 6 as the substrate for a liquid crystal display device according to this embodiment will be described with reference to FIGS. 6 to 12, which are sectional views showing a manufacturing process. First, a low-reflectance Cr film, for example, is formed over the entire surface of a glass substrate 8 as an insulating substrate. Then, a positive novolak-type resist, for example, is applied onto the entire surface at a thickness of about 1.5 μm and patterned into a prescribed shape. The Cr film is etched using the patterned resist layer as a mask and a peeling process is executed, whereby a BM made of low-reflectance Cr is formed as shown in FIG. 6.

Figure 7:
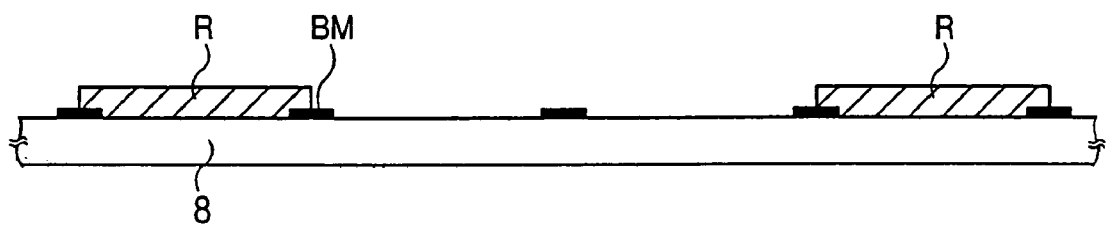
Figure 8:
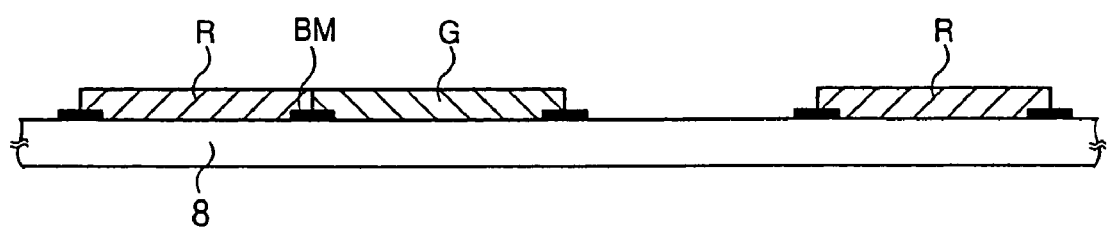
Figure 9:
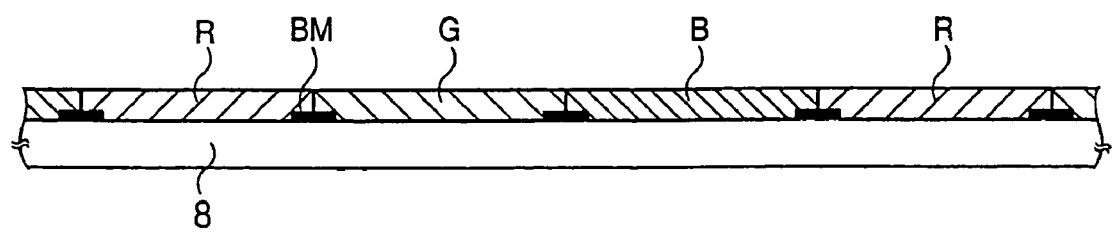
Figure 10:
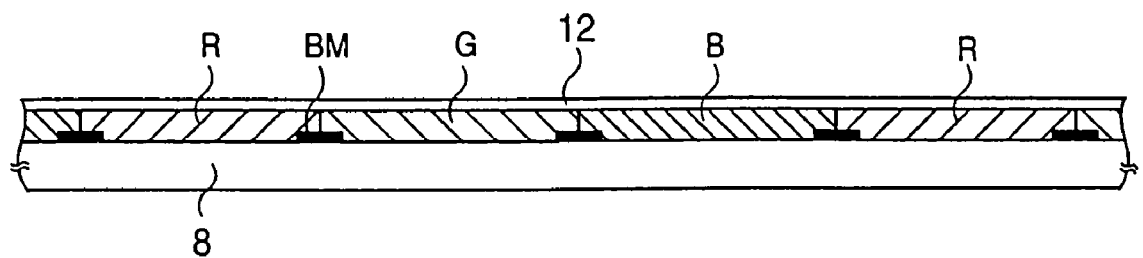

Then, a photosensitive pigment dispersion type R (red) resist is applied at a thickness of 1.5 μm, for example, and patterned by exposure, development, and post-baking steps, whereby color filters R are formed as shown in FIG. 7. Subsequently, color filters G and B are formed in similar manners as shown in FIGS. 8 and 9. Then, as shown in FIG. 10, a common electrode 12 is formed by forming an ITO film over the entire surface at a thickness of 150 nm, for example.

Figure 11:
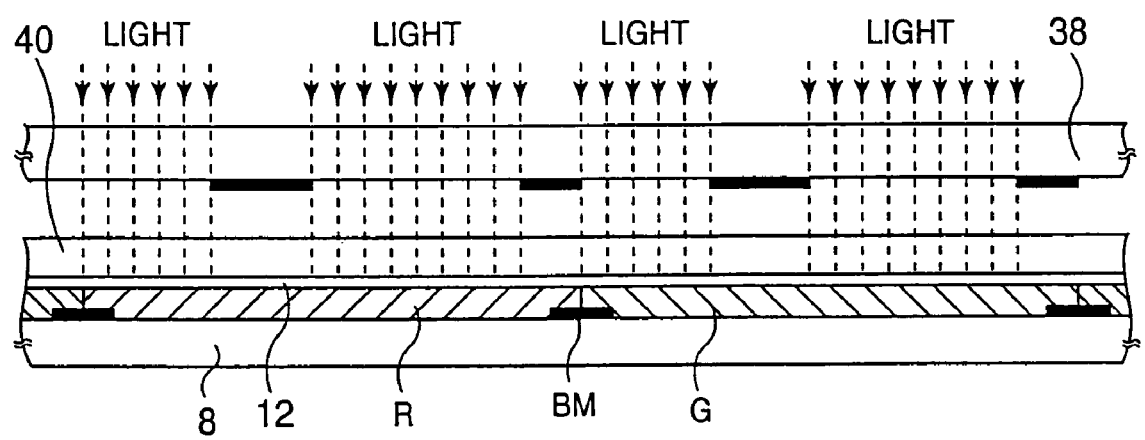
Figure 12:
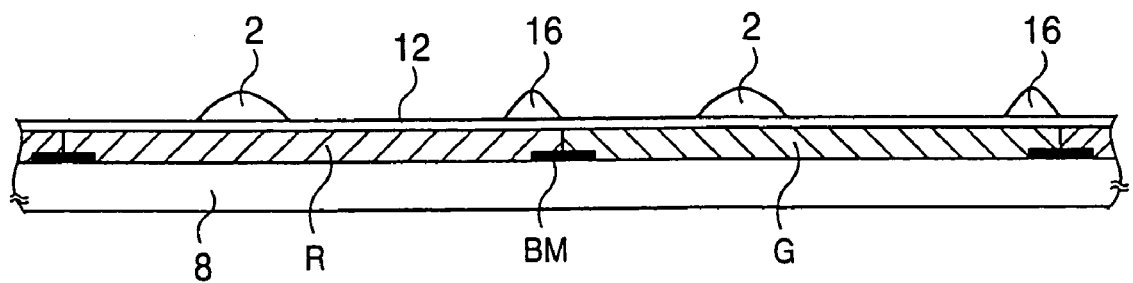

Then, a resist layer 40 is formed by applying a thermoplastic resin resist, for example, a positive novolak-type resist, at a thickness of 1.1 μm. Then, as shown in FIG. 11, the resist layer 40 is exposed to light by using an exposure mask 38 in which the line width of patterns for protrusions 2 is equal to 14 μm, for example, and the line width of patterns for auxiliary protrusions 16 is equal to 10 μm, for example. And, the exposed resist layer 40 is developed, whereby a plurality of thermoplastic resin layers having different line widths are formed. Then, the thermoplastic resin layers are subjected to a heat treatment (annealing) at about 200° C., for example. In this manner, as shown in FIG. 12 a plurality of alignment regulating structures having different widths, that is, protrusions 2 whose sectional shape is 15 μm in width and 1.1 μm in height and auxiliary protrusions 16 whose sectional shape is 11 μm in width and 1.1 μm in height are formed simultaneously. The CF substrate 6 as the substrate for a liquid crystal display device according to this embodiment is completed through execution of the above steps.

Further, vertical alignment films are formed on the opposite surfaces of the above CF substrate 6 and an array substrate 4 in which slits 18 are formed as domain regulating means on the pixel electrodes 10. Then, spacers are sprayed on one of the two substrates 4 and 6, the two substrates 4 and 6 are attached with each other via a sealing agent, and a liquid crystal having negative dielectric anisotropy is injected and sealed. As a result, the liquid crystal display device shown in FIG. 5 according to this embodiment is completed.

Embodiment 1-2

Figure 13:
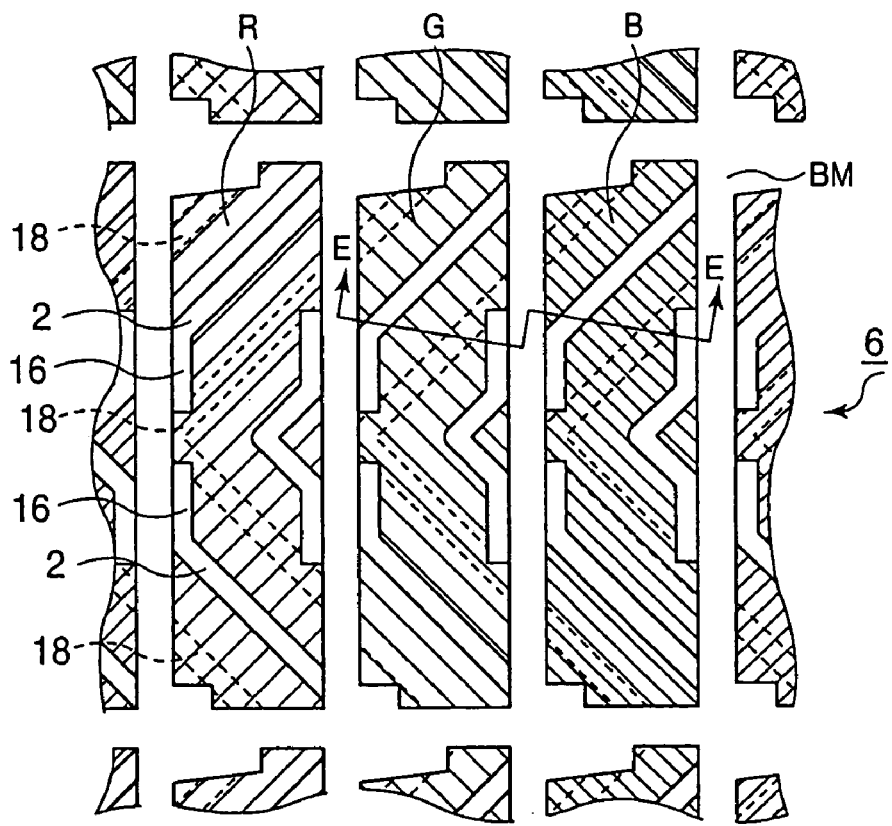
FIG. 13 is a plan view showing the configuration of a substrate for a liquid crystal display device and the configuration of a liquid crystal display device using it according to Embodiment 1-2 of the first basic embodiment of the invention.
Figure 14:
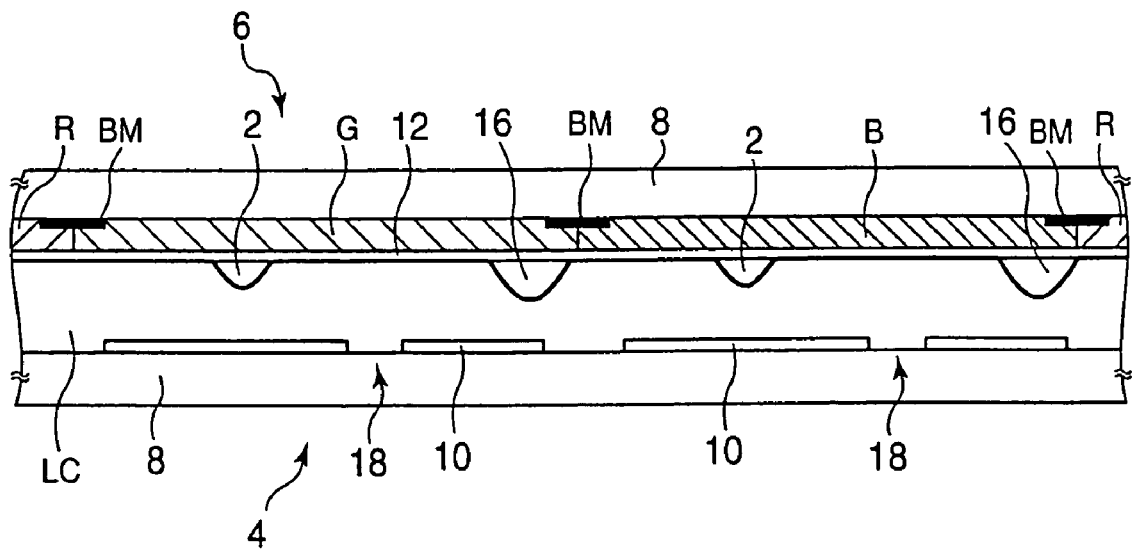
FIG. 14 is a sectional view showing the configurations of the substrate for the liquid crystal display device and the configuration of a liquid crystal display device using it according to Embodiment 1-2 of the first basic embodiment of the invention.

A substrate for a liquid crystal display device, manufacturing method of the substrate, and a liquid crystal display device having the substrate according to this embodiment will be described below with reference to FIGS. 13 to 18. First, the configuration of the substrate for a liquid crystal display device and the configuration of the liquid crystal display device using the substrate according to this embodiment will be outlined with reference to FIGS. 13 and 14. The entire configuration of the liquid crystal display device is the same as in Embodiment 1-1 (see FIG. 3) and hence will not be described. FIG. 13 is a plan view showing the configuration of a CF substrate 6 as a substrate for a liquid crystal display device according to this embodiment and, more specifically, shows three pixels of R, G, and B on the CF substrate 6. FIG. 14 is a sectional view of the substrate for a liquid crystal display device taken along line E—E in FIG. 13. The components in FIGS. 13 and 14 having the same functions as in the corresponding components in FIGS. 1 and 4 are given the same reference symbols as the latter and will not be described. The liquid crystal display device shown in FIG. 13 is characterized in that the sectional shapes of the protrusions 2 and the auxiliary protrusions 16 are different from each other in both of width and height as shown in FIG. 14. The sectional shape of the protrusions 2 is such that the width is 10 μm, for example, and the height is 1.3 μm, for example. The sectional shape of the auxiliary protrusions 16 is such that the width is 16 μm, for example, and the height is 1.4 μm, for example.

Figure 15A:
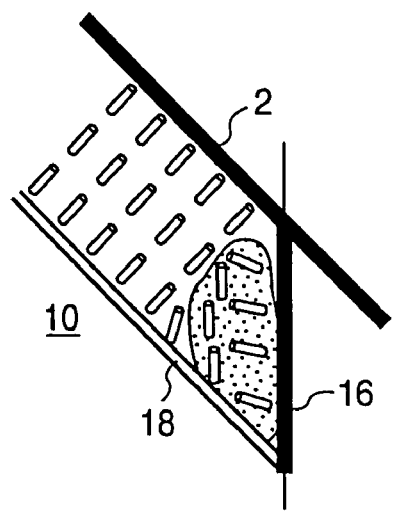
FIGS. 15A and 15B illustrate an advantage of the substrate for a liquid crystal display device and the liquid crystal display device using it according to Embodiment 1-2 of the first basic embodiment of the invention.
Figure 15B:
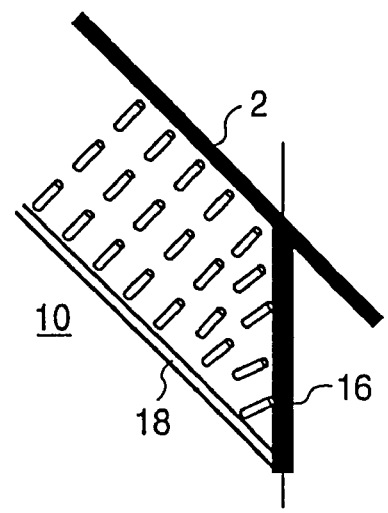

FIG. 15A, which is similar to FIG. 43B, shows a state that the alignment regulating force of an auxiliary protrusion 16 is weak and a low luminance region (hatched in FIG. 15A) occurs in association with an end portion of a pixel electrode 10. In this embodiment, the sectional shape of the auxiliary protrusions 16 is wider and higher than that of the protrusions 2. Therefore, the alignment regulating force of the auxiliary protrusions 16 can be increased in the regions of the end portions of each pixel electrode 10 without increasing the alignment regulating force of the protrusions 2 unduly, as a result of which the alignment is improved in the low luminance regions as shown in FIG. 15B. Further, since only the auxiliary protrusions 16 are made relatively wide and high, increase in the relative area of all the protrusions on the substrate surface can be suppressed and the flatness can be increased as compared to a case where also the protrusions 2 are made wide and high. Therefore, a uniform cell thickness distribution can be obtained when spacers are sprayed.

Figure 16:
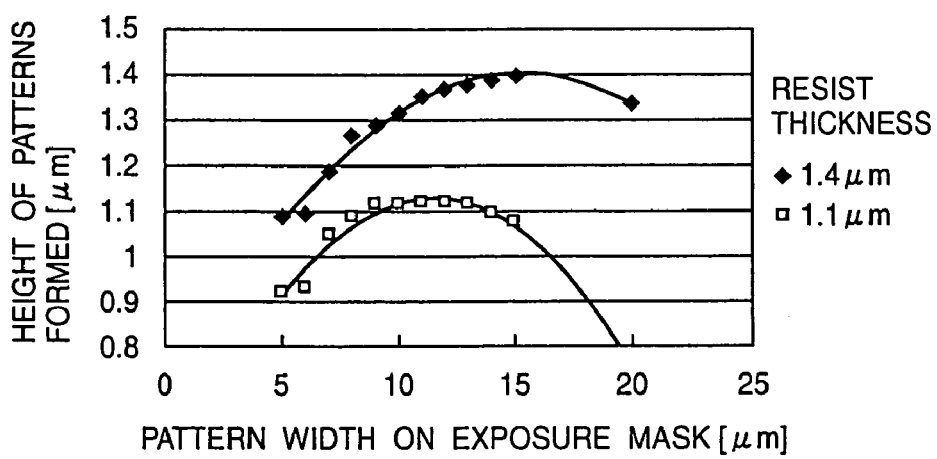
FIG. 16 shows a relationship between the pattern line width on an exposure mask and the height of patterns formed when alignment regulating protrusions are formed by using a positive novolak-type resist that is a thermoplastic resin in Embodiment 1-2 of the first basic embodiment of the invention.

Next, a manufacturing method of the CF substrate 6 as the substrate for a liquid crystal display device according to this embodiment will be described with reference to FIGS. 16 to 18. Part of the manufacturing method of the CF substrate 6 according to this embodiment to formation of a common electrode 12 is the same as in Embodiment 1-1 (see FIGS. 6 to 10) and hence that part of the manufacturing process will not be illustrated nor described.

Before describing steps to be executed after the formation of a common electrode 12, a method for forming alignment regulating protrusions having different heights as shown in FIG. 14 by the same process will be described with reference to FIG. 16. FIG. 16 shows a relationship between the pattern line width on an exposure mask 38 and the height of patterns on a substrate when alignment regulating protrusions are formed by using a positive novolak-type resist that is a thermoplastic resin. The abscissa represents the line width (in μm) of patterns of alignment regulating protrusions on the exposure mask 38 and the ordinate represents the height (in μm) of alignment regulating protrusion's formed. Marks "□" and marks "♦" correspond to cases where the thickness of the positive novolak-type resist that is applied in patterning is equal to 1.1 μm and 1.4 μm, respectively. As shown in FIG. 16, when the thickness of the positive novolak-type resist is 1.1 μm, the height of alignment regulating protrusions formed has almost no variation in a range of the pattern line width on the exposure mask 38 of 7 μm to 15 μm. On the other hand, when the thickness of the positive novolak-type resist is 1.4 μm, the height of alignment regulating protrusions formed increases as the line width on the exposure mask 38 increases from 5 μm to 15 μm. It is concluded that by applying the positive novolak-type resist at a thickness of 1.4 μm, alignment regulating protrusions having different heights can be formed by the same process by changing the pattern line width on the exposure mask 38.

Figure 17:
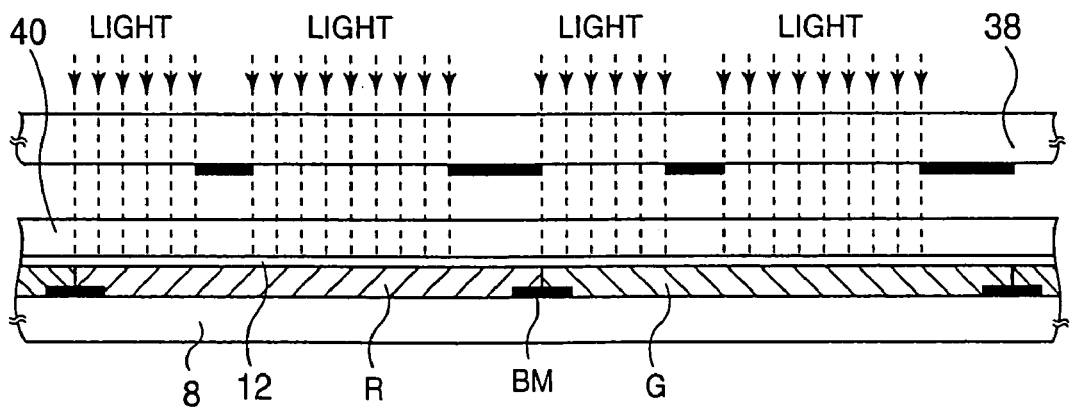
FIGS. 17 and 18 are sectional views showing a manufacturing process of the substrate for a liquid crystal display device according to Embodiment 1-2 of the first basic embodiment of the invention.
Figure 18:
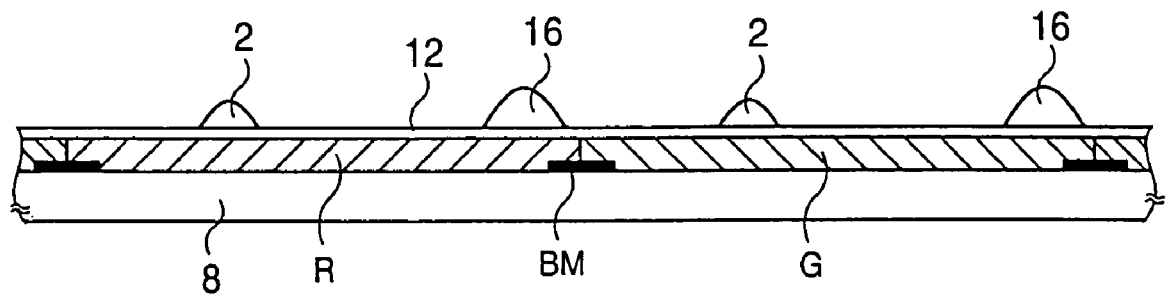

FIGS. 17 and 18 show a process of forming alignment regulating protrusions having different heights using the above-described method. As shown in FIG. 17, a resist layer 40 is formed by applying the positive novolak-type resist, for example, at a thickness of 1.4 μm. The resist layer 40 is exposed to light by using an exposure mask 38 in which the line width of patterns for protrusions 2 is equal to 9 μm, for example, and the line width of patterns for auxiliary protrusions 16 is equal to 15 μm, for example. And, the exposed resist layer 40 is developed, whereby a plurality of thermoplastic resin layers having prescribed shapes are formed. Then, the thermoplastic resin layers are subjected to a heat treatment at about 200° C., for example. In this manner, protrusions 2 whose sectional shape is 10 μm in width and 1.3 μm in height and auxiliary protrusions 16 whose sectional shape is 16 μm in width and 1.4 μm in height are formed as shown in FIG. 18. The CF substrate 6 according to this embodiment is completed through execution of the above steps.

Further, vertical alignment films are formed on the opposite surfaces of the above CF substrate 6 and an array substrate 4 in which on pixel electrodes 10 are formed slits 18 as domain regulating means. Then, spacers are sprayed on one of the two substrates 4 and 6, the two substrates 4 and 6 are attached with each other via a sealing agent, and a liquid crystal having negative dielectric anisotropy is injected and sealed. As a result, the liquid crystal display device shown in FIG. 14 according to this embodiment is completed.

According to this embodiment, since both of the width and the height of the sectional shape of the auxiliary protrusions 16 are changed from those of the sectional shape of the protrusions 2, the alignment regulating force can be increased more effectively than in the case where only the width or height of the sectional shape is changed. Further, since the protrusions 2 and the auxiliary protrusions 16 having different sectional shapes are formed by the same process, the cost does not increase. Therefore, in the VA liquid crystal display device according to this embodiment, a uniform cell thickness distribution can be obtained over the entire substrate display area while the alignment regulating force of a plurality of alignment regulating protrusions formed on the substrate is optimized in each prescribed region, whereby unevenness in a displayed image is less conspicuous and the reliability is increased. Therefore, a high-yield liquid crystal display device that exhibits high luminance and superior display characteristics that are free of color variations and viewing angle-dependent variations can be realized.

Embodiment 1-3

Figure 19:
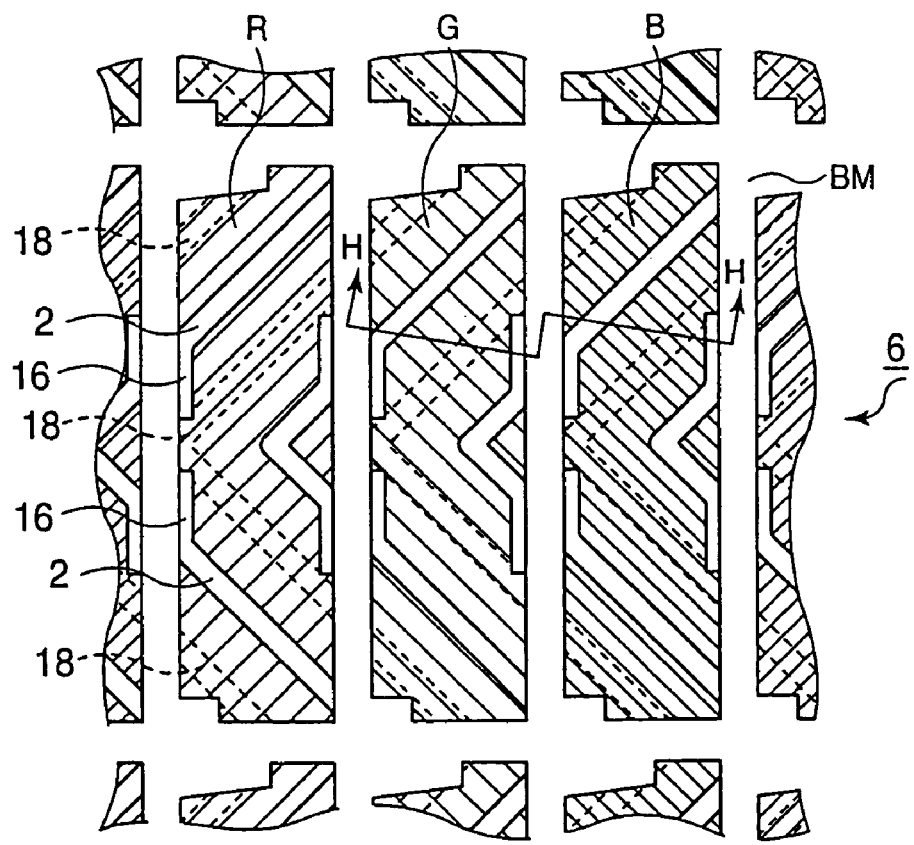
FIG. 19 is a plan view showing the configuration of a substrate for a liquid crystal display device and the configuration of a liquid crystal display device using it according to Embodiment 1-3 of the first basic embodiment of the invention.
Figure 20:
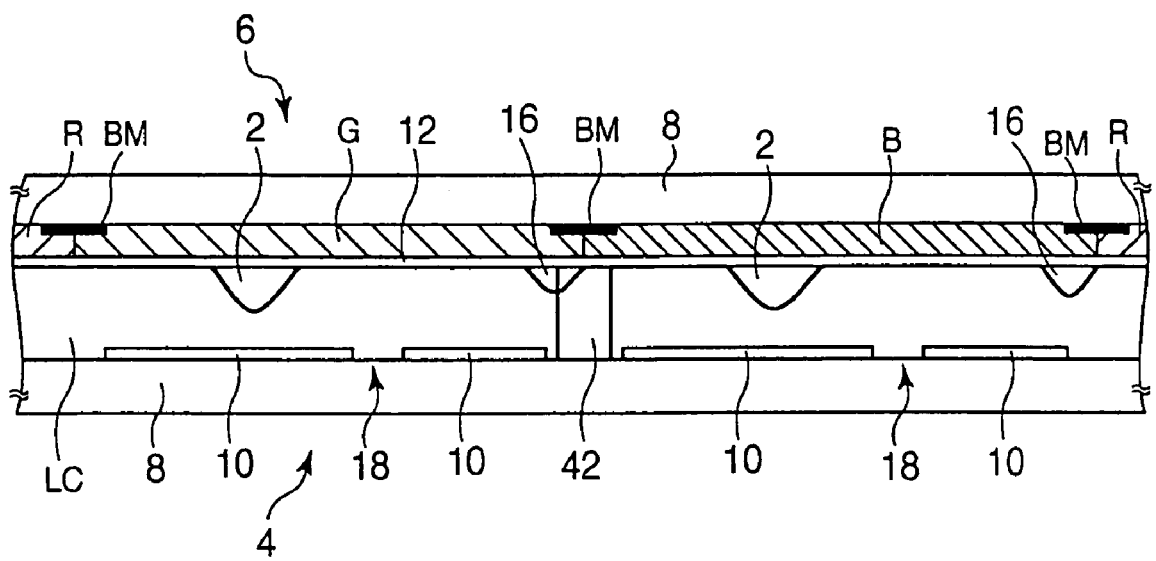
FIG. 20 is a sectional view showing the configurations of the substrate for the liquid crystal display device and the liquid crystal display device using it according to Embodiment 1-3 of the first basic embodiment of the invention.

A substrate for a liquid crystal display device, manufacturing method of the substrate, and a liquid crystal display device having the substrate according to this embodiment will be described below with reference to FIGS. 19 to 23. First, the configuration of the substrate for a liquid crystal display device and the configuration of the liquid crystal display device using the substrate according to this embodiment will be outlined with reference to FIGS. 19 and 20. The entire configuration of the liquid crystal display device is the same as in Embodiment 1-1 (see FIG. 3) and hence will not be described. FIG. 19 is a plan view showing the configuration of a CF substrate 6 as a substrate for a liquid crystal display device according to this embodiment and, more specifically, shows three pixels of R, G, and B on the CF substrate 6. FIG. 20 is a sectional view of the substrate for a liquid crystal display device taken along line H-H in FIG. 19. The components in FIGS. 19 and 20 having the same functions as in the corresponding components in FIGS. 1 and 4 are given the same reference symbols as the latter and will not be described. The liquid crystal display device shown in FIG. 19 is characterized in that the sectional shapes of the protrusions 2 and the auxiliary protrusions 16 are different from each other in both of width and height and that columnar resin spacers 42 are used. The sectional shape of the protrusions 2 is such that the width is 16 µm, for example, and the height is 1.5 µm, for example. The sectional shape of the auxiliary protrusions 16 is such that the width is 8 µm, for example, and the height is 1.3 µm, for example. The resin spacers 42 have a height of 4.0 µm, for example.

Figure 21A:
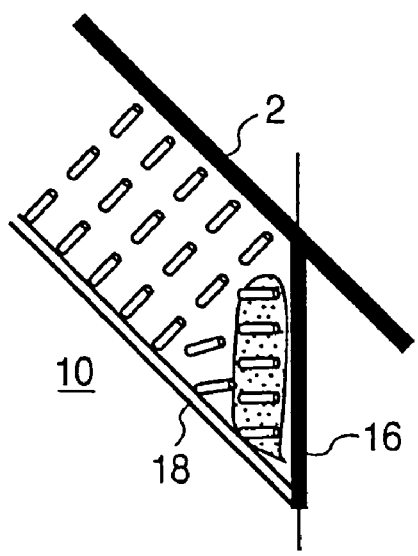
FIGS. 21A and 21B illustrate an advantage of the substrate for a liquid crystal display device and the liquid crystal display device using it according to Embodiment 1-3 of the first basic embodiment of the invention.
Figure 21B:
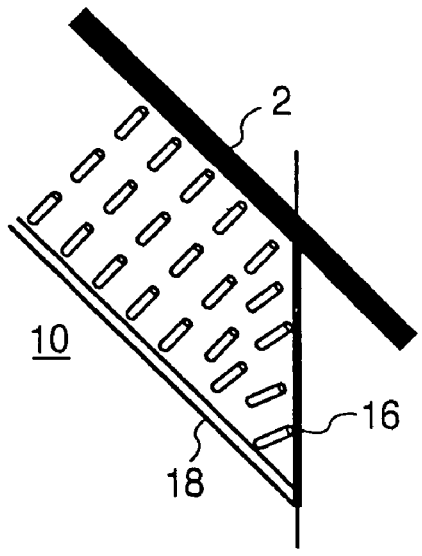
Figure 42:
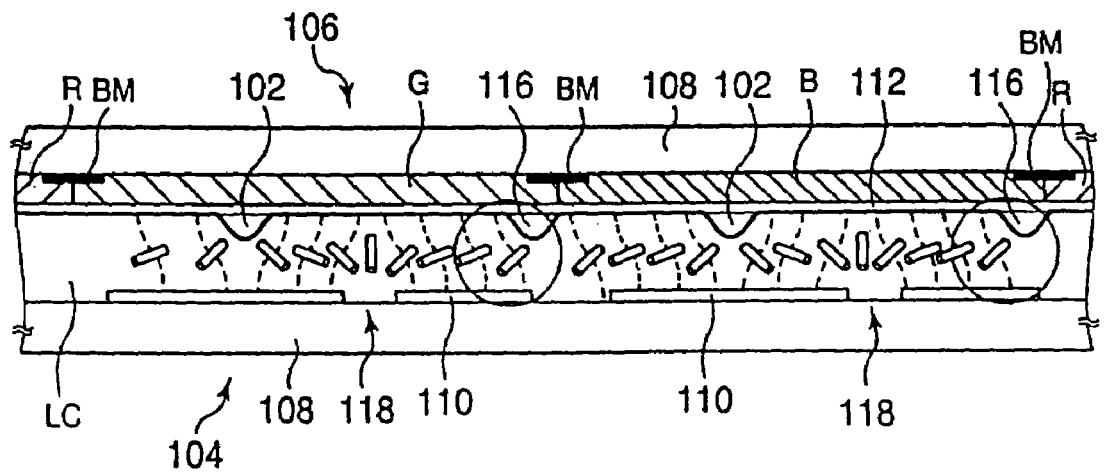
FIG. 42 is a sectional view showing the configurations of the conventional substrate for the liquid crystal display device using the substrate and the liquid crystal display device.
Figure 43C:
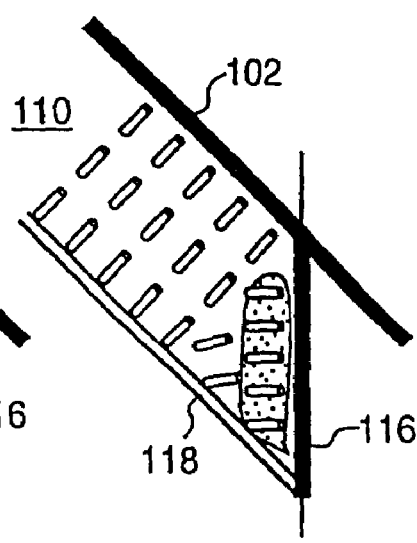

FIG. 21A, which is similar to FIG. 43C, shows a state that the alignment regulating force of an auxiliary protrusion 16 is too strong and a low luminance region (hatched in FIG. 21A) occurs in association with an end portion of a pixel electrode 10. In this embodiment, the sectional shape of the auxiliary protrusions 16 is narrower in width and lower in height than that of the conventional auxiliary protrusions 116 as shown in FIG. 42. Also, the sectional sharp of the protrusions 2 is wider in width and higher in height than that of the conventional protrusions 2 as shown in FIG. 42. Therefore, the alignment regulating force of the auxiliary protrusions 16 can be decreased in the regions of the end portions of each pixel electrode 10 while the alignment regulating force of the protrusions 2 is increased, as a result of which the alignment is improved in the low luminance regions as shown in FIG. 21B.

According to this embodiment, although the relative area of the protrusions on the substrate surface is large and they have large heights, a uniform cell thickness distribution can be obtained by virtue of the presence of the separately formed resin spacers. Therefore, in the VA liquid crystal display device according to this embodiment, a uniform cell thickness distribution can be obtained over the entire substrate display area while the alignment regulating force of a plurality of alignment regulating protrusions formed on the substrate is optimized in each prescribed region, whereby unevenness in a displayed image is less conspicuous and the reliability is increased. Therefore, a high-yield liquid crystal display device that exhibits high luminance and superior display characteristics that are free of color variations and viewing angle-dependent variations can be realized.

Next, a manufacturing method of the CF substrate 6 as the substrate for a liquid crystal display device according to this embodiment will be described with reference to FIGS. 22 and 23. Part of the manufacturing method of the CF substrate 6 according to this embodiment to formation of a common electrode 12 is the same as in Embodiment 1-1 (see FIGS. 6 to 10) and hence that part of the manufacturing process will not be illustrated nor described.

Figure 22:
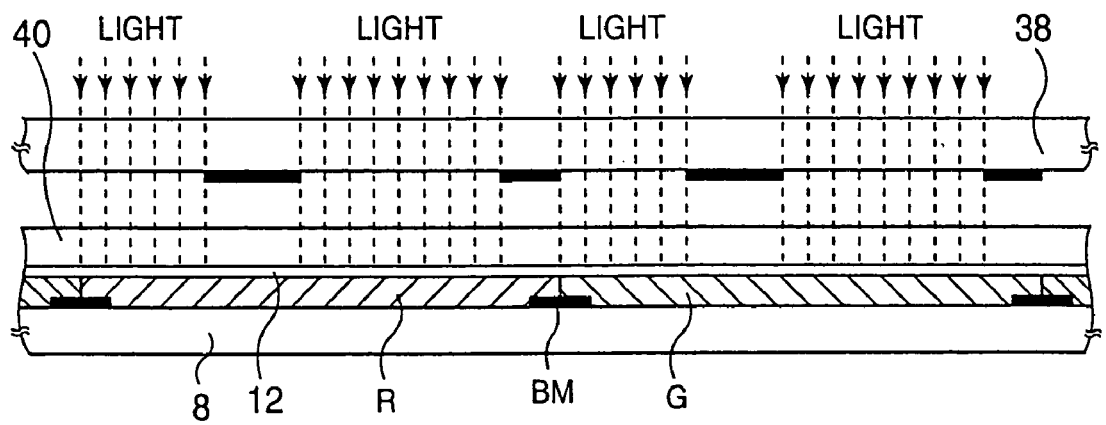
FIGS. 22 and 23 are sectional views showing a manufacturing process of the substrate for a liquid crystal display device according to Embodiment 1-3 of the first basic embodiment of the invention.
Figure 23:
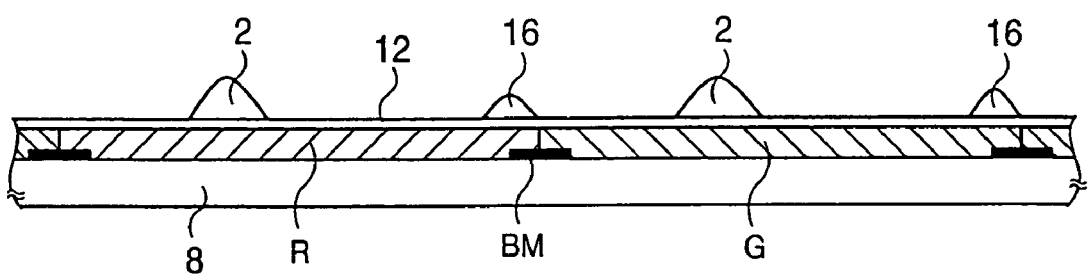

FIGS. 22 and 23 show a process of forming alignment regulating protrusions having different heights using the above-described method. As shown in FIG. 22, a resist layer 40 is formed by applying a positive novolak-type resist, for example, at a thickness of 1.5 µm. The resist layer 40 is exposed to light by using an exposure mask 38 in which the line width of patterns for protrusions 2 is equal to 15 µm, for example, and the line width of patterns for auxiliary protrusions 16 is equal to 7 µm, for example. And, the exposed resist layer 40 is developed, whereby a plurality of thermoplastic resin layers having prescribed shapes are formed. Then, the thermoplastic resin layers are subjected to a heat treatment at about 200° C., for example. In this manner, protrusions 2 whose sectional shape is 16 µm in width and 1.5 µm in height and auxiliary protrusions 16 whose sectional shape is 8 µm in width and 1.3 µm in height are formed as shown in FIG. 23. Then, resin spacers are formed by applying and patterning a 4.0-µm-thick, photosensitive, negative acrylic resist, for example. The CF substrate 6 according to this embodiment is completed through execution of the above steps.

Further, vertical alignment films are formed on the opposite surfaces of the above CF substrate 6 and an array substrate 4 in which on pixel electrodes 10 are formed slits 18 as domain regulating means. Then, the two substrates 4 and 6 are attached with each other via a sealing agent and a liquid crystal having negative dielectric anisotropy is injected and sealed. As a result, the liquid crystal display device shown in FIG. 20 according to this embodiment is completed.

According to this embodiment, since both of the width and the height of each of the sectional shape of the protrusions 2 and the sectional shape of the auxiliary protrusions 16 are changed from those of the conventional case, the alignment regulating force can be increased more effectively than in the case where only the width or height of the sectional shape is changed. Further, since the protrusions 2 and the auxiliary protrusions 16 having different sectional shapes are formed by the same process, the cost does not increase.

The invention is not limited to the above basic embodiment and various modifications are possible.

For example, although in the first basic embodiment, the BM is made of low-reflectance Cr, the invention is not limited such a case. The BM may be made of other materials such as a black resin, or may be formed by laminating color filter forming materials one on another.

Although in the first basic embodiment, the alignment regulating protrusions are formed on only the CF substrate 6 side, the invention is not limited to such a case; alignment regulating protrusions may also be formed on the array substrate 4 side. Only one of the width and height of the sectional shape of the alignment defining protrusions may be changed through changing both of them is more effective.

Although in the first basic embodiment, the alignment regulating protrusions having different sectional shapes are formed by using a positive novolak-type resist that is a thermoplastic resin, the invention is not limited to such a case; other thermoplastic resins including even negative ones may be used. Although in the first basic embodiment, the alignment regulating protrusions having different sectional shapes are formed by the same process, they may be formed by separate processes. In the latter case, the alignment regulating protrusions may be formed by using materials other than thermoplastic resins, such as acrylic materials and polyimide materials.

Although in the first basic embodiment, the pigment dispersion method is used as a color filter forming method, the invention is not limited to such a case, that is, other methods may be used. Further, a transparent planarizing film may be formed under the common electrode 12.

Second Basic Embodiment

A substrate for a liquid crystal display device, manufacturing method of the substrate, and a liquid crystal display device having the substrate according to a second basic embodiment of the invention will be described with reference to FIGS. 24 to 34A to 34C.

This embodiment relates to a substrate for liquid crystal display device in which resin spacers for controlling the cell thickness are formed, particularly to a CF substrate in which resin spacers are formed and a manufacturing method of a liquid crystal display device using the substrate.

One common method for controlling the cell thickness is to spray spherical spacers such as plastic beads on a substrate and attaching the substrate on an opposite substrate. However, this method has problems that alignment defects may occur in the regions in the vicinity of spherical spacers sprayed in each pixel and that light leakage occurring there may lower the contrast. As the size of the substrate increases, it becomes more difficult to spray spherical spacers uniformly and hence the cell thickness variation on the substrate surface becomes larger. In such display modes as IPS (in-plane switching) and MVA (multi-domain vertical alignment), the luminance varies more greatly with respect to a cell thickness variation than in the TN (twisted nematic) mode. Therefore, in the former display modes, control should be made so as to provide a more even cell thickness distribution. Further, in high-resolution panels, the area of each pixel is smaller and hence spherical spacers occupy a larger area relative to the pixel area; the influences of the spherical spacers to the display quality are more remarkable.

In view of the above, with the recent increases in the size of substrates for a liquid crystal display device and the resolution of panels, a resin spacer forming method in which a resin is patterned by a photolithography technique has come to be used as means capable of disposing spacers at arbitrary positions and suppressing a cell thickness variation in the panel surface. By using a photolithography technique, resin spacers can be formed in, for example, the BM light shield region on the CF substrate at an arbitrary density. Therefore, this method is free of alignment defects and light leakage in each pixel that would otherwise be problematic with the use of spherical spacers. In contrast to the case of spherical spacers having a variation in particle diameter, the thickness of resin spacers can be made uniformly in terms of film thickness. Therefore, the use of resin spacers makes it possible to provide a more even cell thickness distribution and determine the cell thickness more accurately. This makes it possible to manufacture a higher-quality liquid crystal display device than in the case where the cell thickness is determined by using spherical spacers.

Figure 24:
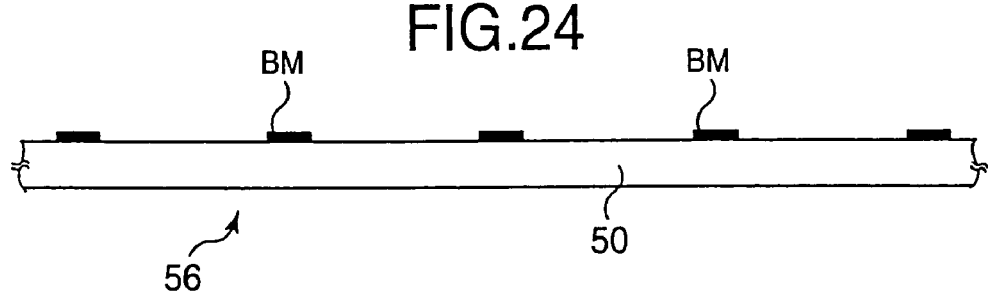
FIGS. 24 to 30 are sectional views showing a manufacturing process of a substrate for a liquid crystal display device according to Embodiment 2-1 of the second basic embodiment of the invention.
Figure 25:
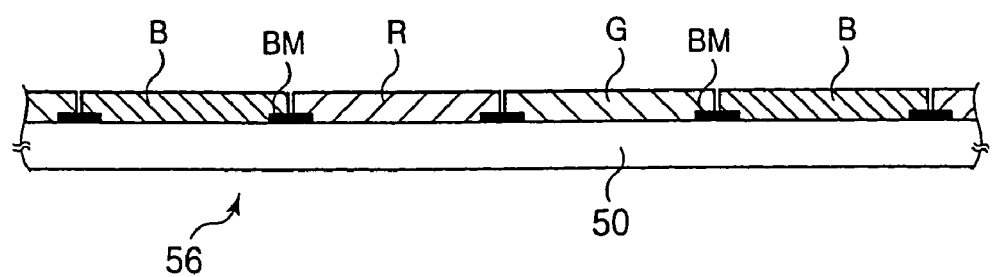
Figure 26:
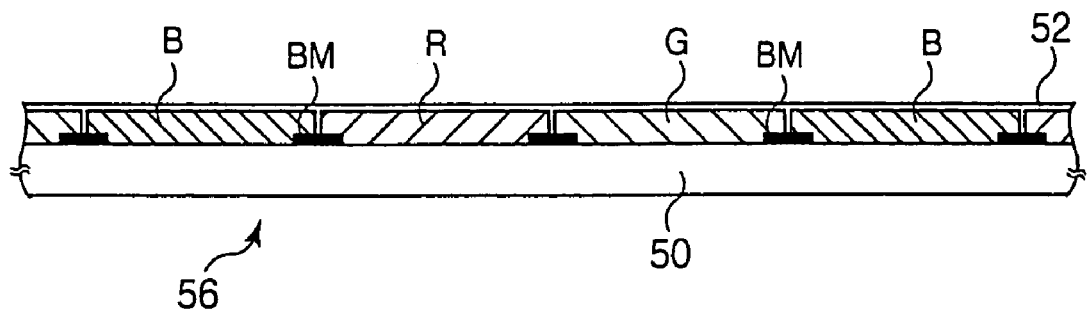
Figure 27:
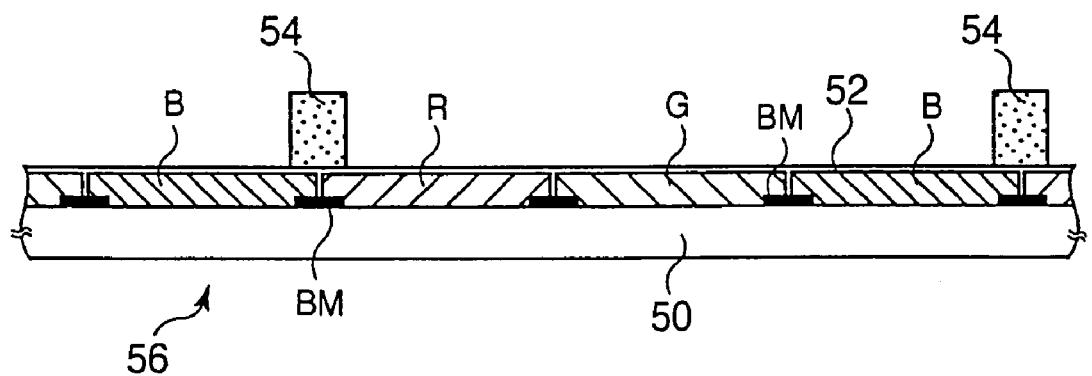
Figure 28:
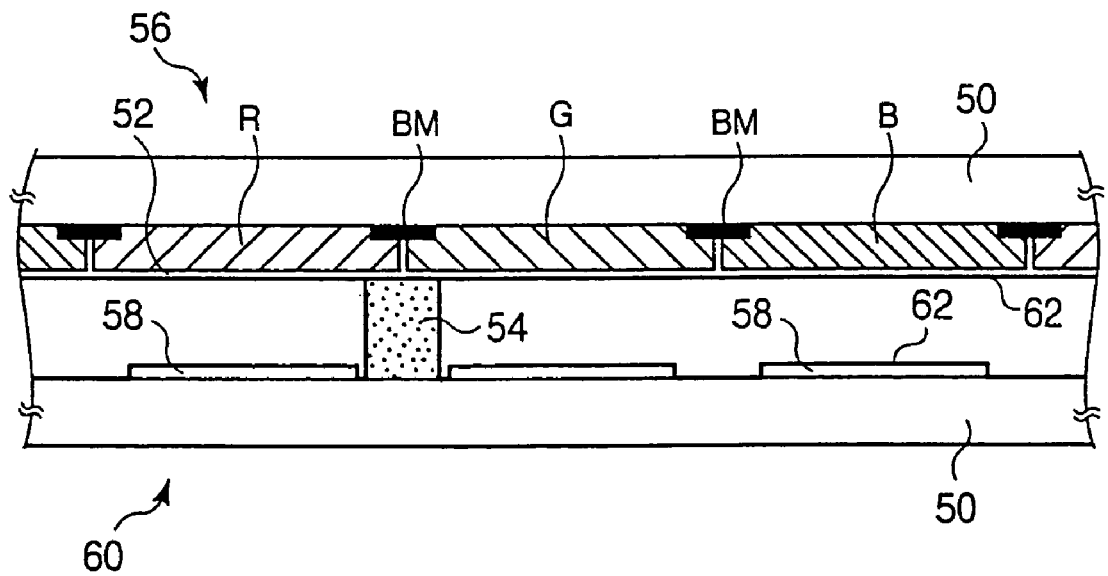

An exemplary method for resin spacers on a CF substrate 56 as a substrate for a liquid crystal display device will be described with reference to FIGS. 24 to 28. First, as shown in FIG. 24, a BM is made of Cr or a black resin on a glass substrate 50 that is an insulating substrate. Then, as shown in FIG. 25, color filters R, G, and B are formed sequentially by using pigment dispersion type photosensitive colored resins or the like. Then, as shown in FIG. 26, a common electrode 52 is formed by sputtering a transparent electrode made of ITO or the like. Subsequently, as shown in FIG. 27, an acrylic resin type, negative photosensitive resist, for example, is applied and resin spacers 54 having an arbitrary size are formed at arbitrary positions at an arbitrary distribution density by using a photolithography method. Then, as shown in FIG. 28, alignment films 62 are formed on the opposite surfaces of the CF substrate 56 and an array substrate 60, rubbing is performed if necessary, the two substrates 56 and 60 are attached with each other, and a liquid crystal is injected and sealed, whereby a liquid crystal display device is completed.

In the above manufacturing method, resin spacers 54 may be formed after formation of the alignment films 62. Still another method is possible in which an overcoat layer is formed by using an acrylic resin, an epoxy resin, or the like and then planarized after formation of the color filters R, G, and B and resin spacers 54 are formed thereon. Naturally, resin spacers 54 may be formed on the array substrate 60 side.

Usually, the resin spacers 54 are formed in a region that is shielded from light by the BM at a thickness of 4 to 5 µm so as to assume 10 to 30 µm squares when viewed perpendicular to the substrate surface. Important factors in regulating the distribution density of resin spacers 54 are physical properties the material of the resin spacers 54 such as the compressive displacement and the plastic deformation amount. Therefore, the distribution density of resin spacers 54 is determined so that they are given such softness as to be able to follow thermal expansion and contraction as well as sufficient resistance to pressure (hardness). The resin spacers 54 that are designed to be distributed at such a density occupy approximately 1% or less of the area of each pixel region of the substrate in the display area.

Where resin spacers 54 are to be made of a photosensitive resin, the process for forming resin spacers 54 includes application of a resin, exposure, development, and calcination. When unevenness in the thickness of the resin spacers 54 occurs due to uneven application of a resin in the application step, it is difficult to restore only the spacer layer after the resin calcination. It is therefore necessary to perform a pattern test after the development and before the calcination. Usually, in this pattern test, the presence or absence of thickness unevenness in a pattern is checked by visual inspection while the substrate surface on which the resin spacers 54 are formed is irradiated with light emitted from a high-intensity lamp, an Na lamp, or the like or Fresnel light. Although thickness unevenness in a solid photosensitive resin film formed over the entire surface can be detected satisfactorily, it is very difficult to detect thickness unevenness of the resin spacers 54 that are dispersed on the substrate as described above because the pattern area is 1% or less of the display area. It is also difficult to detect such thickness unevenness after the calcination of the resin spacers 54. Such thickness variation is first detected as display unevenness by visual inspection that is performed after the CF substrate 56 and the array substrate 60 are attached together and the liquid crystal is sealed. Since recovery from a display defect due to thickness unevenness of the resin spacers 54 is impossible, not only the CF substrate 56 but also the array substrate 60 and other members need to be discarded, which causes an extra increase in manufacturing cost.

To cope with the above problem, in this basic embodiment, a plurality of dummy patterns are formed in addition to resin spacers 54 in forming the resin spacers 54 by applying a photosensitive resin. The total area of the resin spacers 54 and the dummy patterns is set at 10% or more of the area of the display area when viewed perpendicular to the substrate surface. This makes it possible to detect visually thickness unevenness of the resin spacers 54 that is caused by application unevenness or the like even after the development and before the calcination. Since thickness unevenness of the resin spacers 54 can be found before the calcination, if it is found, a recovery process can easily be executed in which only the photosensitive resin as the material of the resin spacers 54 and the dummy patterns are removed by using a resist stripper. Further, finding a defective substrate early, that is, in the CF substrate 56 manufacturing process, reduces the manufacturing cost as well as increases the production yield of the liquid crystal display device.

By additionally forming, in forming resin spacers 54, through exposure and development, dummy test patterns having a dimension that is close to the resolution limit of an exposure apparatus used in the photolithography process, it becomes possible to judge whether the application thickness in the vicinity of the resin spacers 54 is thick or thin only by non-contact observation of the dummy patterns with a microscope without the need for measuring the thickness of the resin spacers 54 with a contact-type film thickness meter. When the thickness of the resin spacers 54 is greater than a regular thickness, an observed dummy pattern should have a remarkable shape difference and hence thickness abnormality of the resin spacers 54 can be found relatively easily.

The substrate for a liquid crystal display device and the liquid crystal display device having the substrate according to this basic embodiment will be described in more detail by using Embodiments 2-1 and 2-2.

Embodiment 2-1

Figure 29:
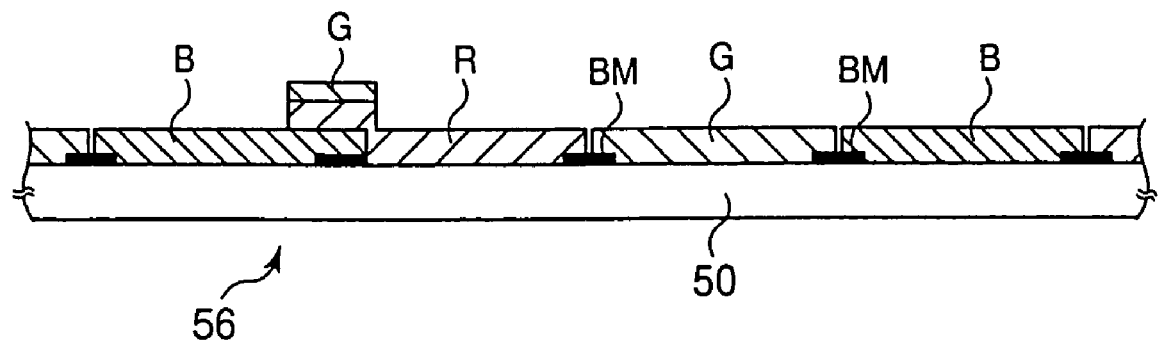

In this embodiment, how resin spacers are formed on a CF substrate will be described with reference to FIGS. 24 to 27 (already referred to above) and FIGS. 29 to 31 (newly referred to). First, as shown in FIG. 24, a BM is formed by sputtering Cr on a glass substrate 50 and patterning the Cr layer. Then, as shown in FIG. 25, 1.5-μm-thick color filters R, G, and B are formed by sequentially forming color filter forming layers of pigment dispersion type acrylic resin type negative color resists. In forming the color filters R, G, and B, as shown in FIG. 29, resin spacer 54 forming surfaces are formed by laminating three color filter forming layers one on another in BM regions, thereby forming resin spacers 54 for regulating the cell thickness. Because of the leveling characteristic of the acrylic resin type negative color resists, the resin spacer 54 forming surfaces are formed at a height of about 1.8 μm as measured from the surfaces of the color filters R, G, and B that are formed in the respective pixel regions. Then, not shown in any drawings, a common electrode 52 that is a transparent electrode made of ITO or the like is formed by sputtering in the same manner as shown in FIG. 26.

Figure 30:
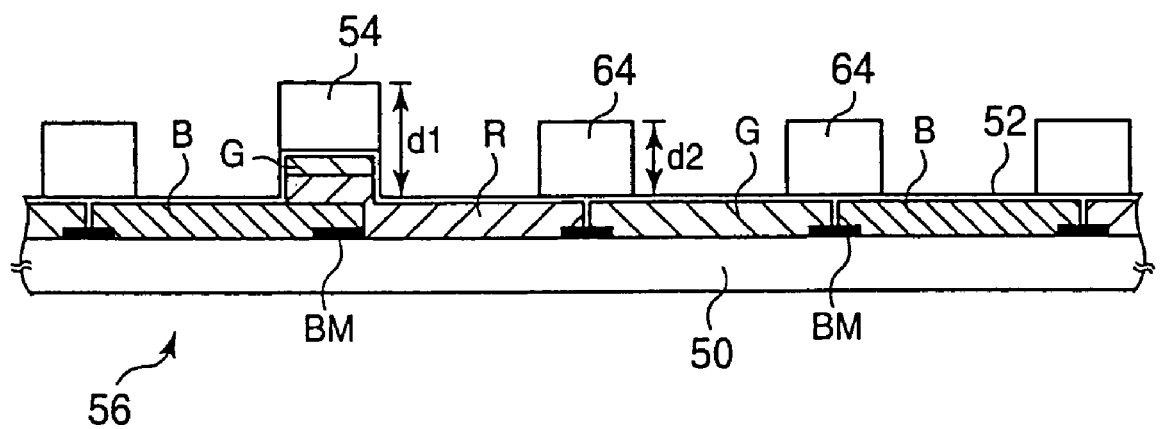
Figure 31:
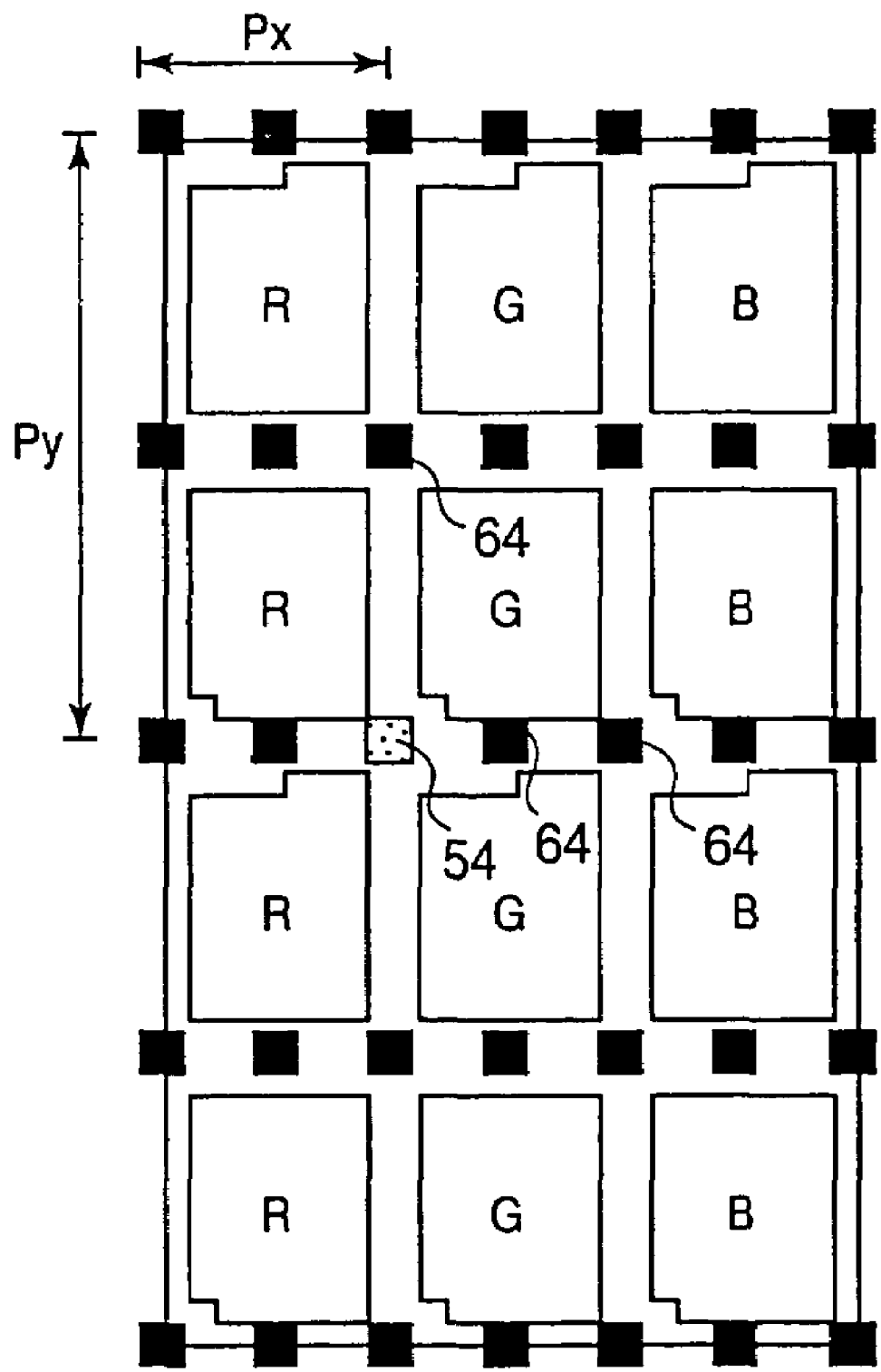
FIG. 31 is a plan view showing the manufacturing process of the substrate for a liquid crystal display device according to Embodiment 2-1 of the second basic embodiment of the invention.

Subsequently, as shown in a sectional view of FIG. 30 and a substrate plan view of FIG. 31, patterns of a plurality of resin spacers 54 (only one resin spacer 54 is shown in FIGS. 30 and 31) are formed by using an acrylic resin type negative resist, for example. An area of each of the resin spacers 54 is 30 μm×30 μm square. At the same time as this patterning is performed, a plurality of dummy patterns 64 to be used for checking thickness unevenness of the resin spacers 54 are formed by using the resin spacer 54 forming material in such a manner that their tops are lower than the tops of the resin spacers 54. In this example, the total area of the resin spacers 54 and the dummy patterns 64 when viewed perpendicular to the substrate surface is set at 12% or more of the area of the display area. FIG. 31 shows 3×2=6 pixels (subpixels) each measuring Px×Py. The BM is formed around the pixels and in the regions of the storage capacitor lines that traverse the pixels at the centers. In this example, one resin spacer 54 is formed on the BM for six pixels and the dummy patterns 64 are formed on the BM in matrix form approximately at regular intervals.

As shown in FIG. 30, since the resin spacer 54 forming surfaces are those portions of the top surface of the common electrode 52 which are in the regions where the color filter forming layers are laminated one on another, they are higher than the dummy pattern 64 forming surfaces that are portions of the common electrode 52 in the pixel regions. What will function as spacers for keeping the cell thickness constant are the resin spacers 54 whose height d1 is equal to 4.0 μm when measured from the portions of the common electrode 52 in the pixel regions after annealing. The dummy patterns 64, whose height d2 is equal to 3.0 μm when measured from the portions of the common electrode 52 in the pixel regions after the annealing, will not be in contact with the opposite substrate after formation of a panel and hence will not serve as spacers for keeping the cell thickness constant.

Since as described above, the resin spacers 54 to be formed on the elevated portions need to be higher than the dummy patterns 64, it is desirable that the resist that is used for forming the resin spacers 54 not have a good leveling characteristic. Alternatively, its leveling characteristic may be worsened by conducting low-pressure drying after the application.

The process then goes to a testing step. Whether the resin spacers 54 have thickness unevenness is checked by visually inspecting, under illumination by a high-intensity lamp, the CF substrate 56 in which the resin spacers 54 and the dummy patterns 64 were formed in the above spacer forming step. Since the total area of the resin spacers 54 and the dummy patterns 64 in the display area when viewed perpendicular to the substrate surface is 10% or more of the area of the display area, thickness variation, if any, of the resin spacers 54 can be recognized visually. As for a substrate with which thickness unevenness of the resin spacers 54 has been found, the resin spacers 54 and the dummy patterns 64 are removed by peeling by using a resist stripper, for example, and resin spacers 54 can be formed again by a recovery process.

A CF substrate 56 with which no unevenness of the resin spacers 54 has been found is calcined at about 200° C. for about one-hour, whereby the resin spacers 54 are completed.

Alignment films (not shown) are formed on the opposite surfaces of the CF substrate 56 thus formed and an array substrate 60, a liquid crystal is injected into a cell formed by attaching together the substrates 56 and 60 and then sealed, and finally polarizers are attached with a resulting panel, whereby a liquid crystal display device is completed.

In this embodiment, the dummy patterns 64 that will not function as spacers are formed in such a manner that their top surfaces are lower than the top surfaces of the resin spacers 54 at the same time as the resin spacers 54 are formed. The total area of the resin spacers 54 and the dummy patterns 64 when viewed perpendicular to the substrate surface is such as to enable visual recognition of spacer thickness unevenness, if any. Therefore, thickness unevenness of the resin spacers 54 that will cause a display defect after a liquid crystal display panel is assembled can be recognized visually after the exposure and development of the resin spacers 54 and before its calcination. Although in this embodiment, the total area of the resin spacers 54 and the dummy patterns 64 when viewed perpendicular to the substrate surface is set at 12% or more, it is desirable that the total area be set at 30% or more, in which case thickness unevenness after the development can be recognized more easily.

Since spacer thickness unevenness can be found before the calcination of the resin spacers 54, the resin spacers 54 can be removed by peeling and a substrate from which the resin spacers 54 have been removed can be reused from the spacer forming step. Further, since no defective CF substrates 56 having spacer thickness unevenness are input to the spacer forming step and the subsequent steps, occurrence of defective panels due to a cell thickness defect is prevented and the manufacturing cost can be reduced accordingly. Although in this embodiment, the resin spacers 54 are formed on the CF substrate 56 side, naturally they may be formed on the array substrate 60 side.

Embodiment 2-2

Figure 32:
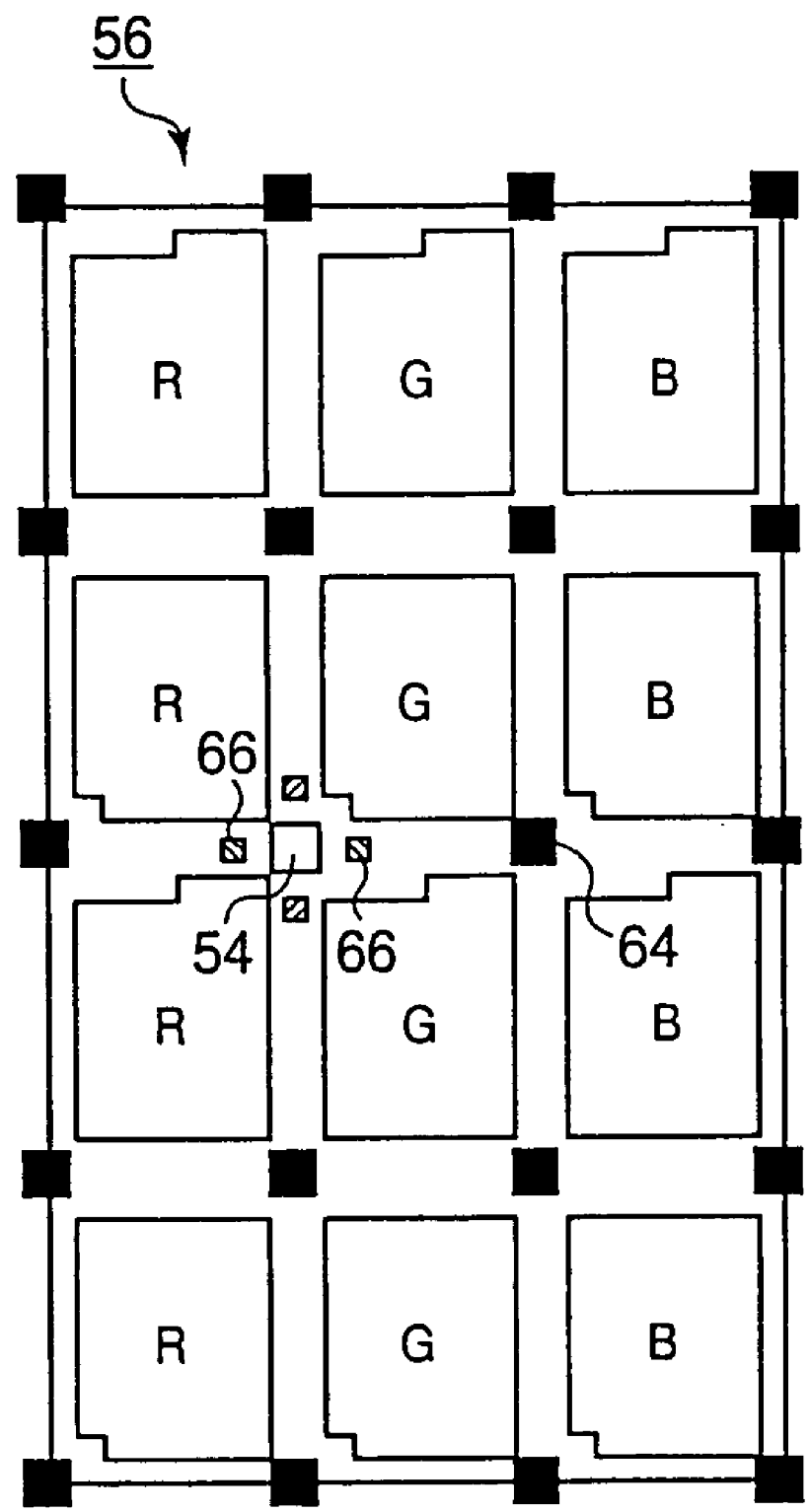
FIG. 32 is a plan view showing a manufacturing process of a substrate for a liquid crystal display device according to Embodiment 2-2 of the second basic embodiment of the invention.

Also in this embodiment, how resin spacers 54 are formed on a CF substrate 56 will be described with reference to FIGS. 32 to 34. A BM, color filters R, G, and B, and a common electrode 52 are formed in the same manners as in Embodiment 2-1. In forming the color filters R, G, and B, as shown in FIG. 29 (used for the description of Embodiment 2-1), resin spacer 54 forming surfaces are formed by laminating three color filter forming layers one on another in BM regions, thereby forming resin spacers 54 for regulating the cell thickness. Thus, the resin spacer forming surfaces are made higher than the surfaces of the other regions.

Then, a novolak resin type, positive, photosensitive photoresist is applied to a glass substrate 50 at a thickness of 3 μm. As shown in FIG. 32, not only a plurality of resin spacers 54 (only one resin spacer 54 is shown in FIG. 32) and a plurality of dummy patterns 64 but also dummy test patterns 66 are formed through exposure by a proximity exposure method or the like and development. FIG. 32, which is similar to FIG. 31, shows a state that one resin spacer 54 is formed on the BM for six pixels and the dummy patterns 64 are formed on the BM in matrix form approximately at regular intervals. Further, the dummy test patterns 66 having a smaller area than the dummy patterns 64 when viewed perpendicular to the substrate surface and to be used for checking the thickness of resin spacers 54 in an uneven thickness region are formed as shown in FIG. 32. FIG. 32 shows that four approximately square dummy test patterns 66 are formed on the BM adjacent to one resin spacer 54.

In the same manner as shown in FIG. 30 (used for the description of Embodiment 2-1), the resin spacer 54 forming surfaces are those portions of the top surface of the common electrode 52 which are formed in the regions where the color filter forming layers are laminated one on another. Therefore, the resin spacer 54 forming surfaces are higher than the dummy pattern 64 forming surfaces that are portions of the common electrode 52 in the pixel regions. What will function as spacers for keeping the cell thickness constant are the resin spacers 54 whose height d1 is equal to 4.0 μm when measured from the portions of the common electrode 52 in the pixel regions after annealing. The dummy patterns 64, whose height d2 is equal to 3.3 μm when measured from the portions of the common electrode 52 in the pixel regions after the annealing, will not be in contact with the opposite substrate after formation of a panel and hence will not serve as spacers for keeping the cell thickness constant.

Next, the dummy test patterns 66 will be described in more detail with reference to FIGS. 33 and 34. FIG. 33 includes sectional views, cut by a plane perpendicular to the substrate surface, of resist patterns (dummy test patterns 66) formed by applying a novolak resin type, positive, photosensitive photoresist on a substrate, transferring patterns by using an exposure mask having pattern formation widths that are close to the resolution limit, and then performing development. Parts (A) to (E) of FIG. 33 show square Cr light shield patterns on the mask M. The widths of the light shield patterns (A) to (E) are 8 μm, 6 μm, 4 μm, 3 μm, and 2 μm, respectively. Row (a) of FIG. 33 shows sectional shapes of dummy test patterns 66 that are provided with the light shield patterns (A) to (E) in a case where the resist application thickness T is equal to 3 μm. Row (b) shows sectional shapes of dummy test patterns 66 that are provided with the light shield patterns (A) to (E) in a case where the resist application thickness is smaller than 3 μm. Row (c) shows sectional shapes of dummy test patterns 66 that are provided with the light shield patterns (A) to (E) in a case where the resist application thickness is greater than 3 μm.

Figure 33:
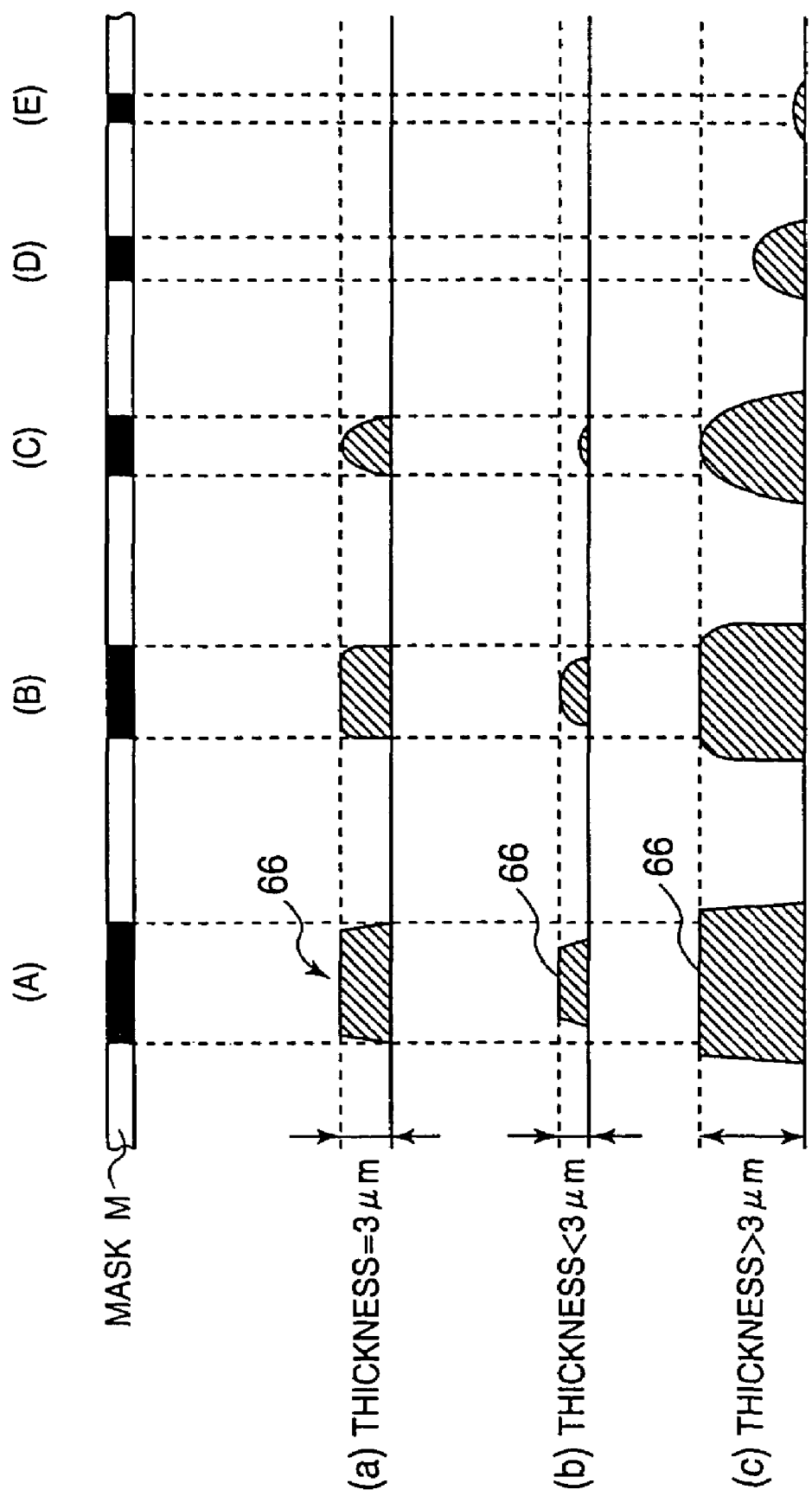
FIG. 33 includes sectional views of dummy test patterns according to Embodiment 2-2 of the second basic embodiment of the invention.
Figure 34:
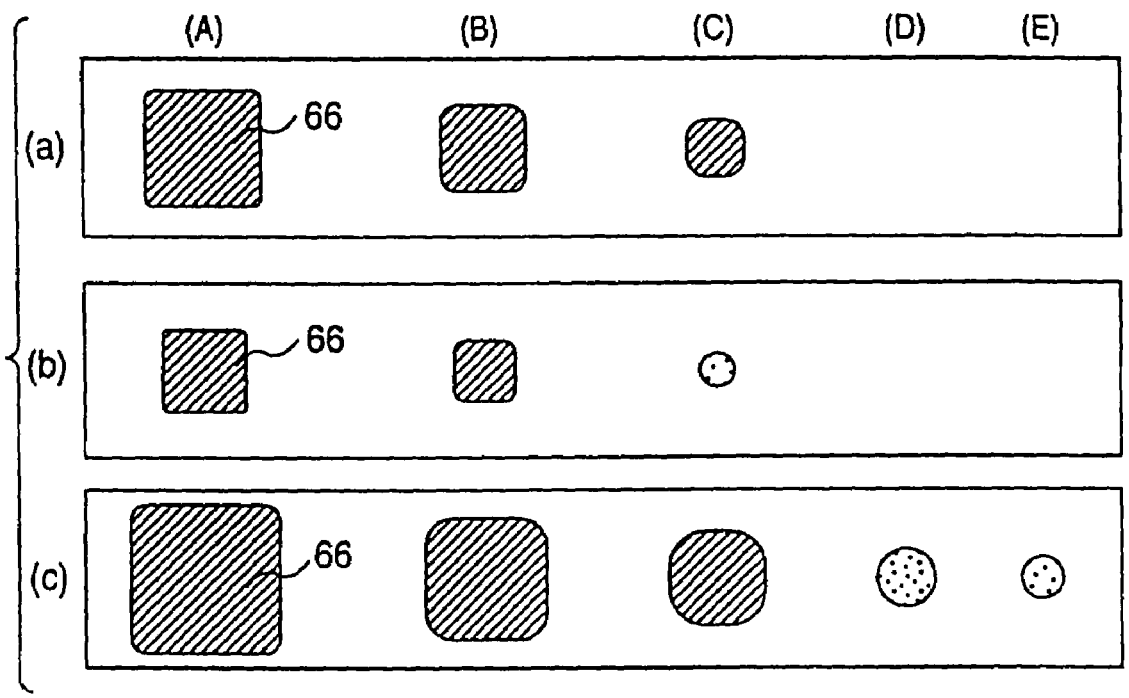
FIG. 34 is plan views of dummy test patterns according to Embodiment 2-2 of the second basic embodiment of the invention.
Figure 35:
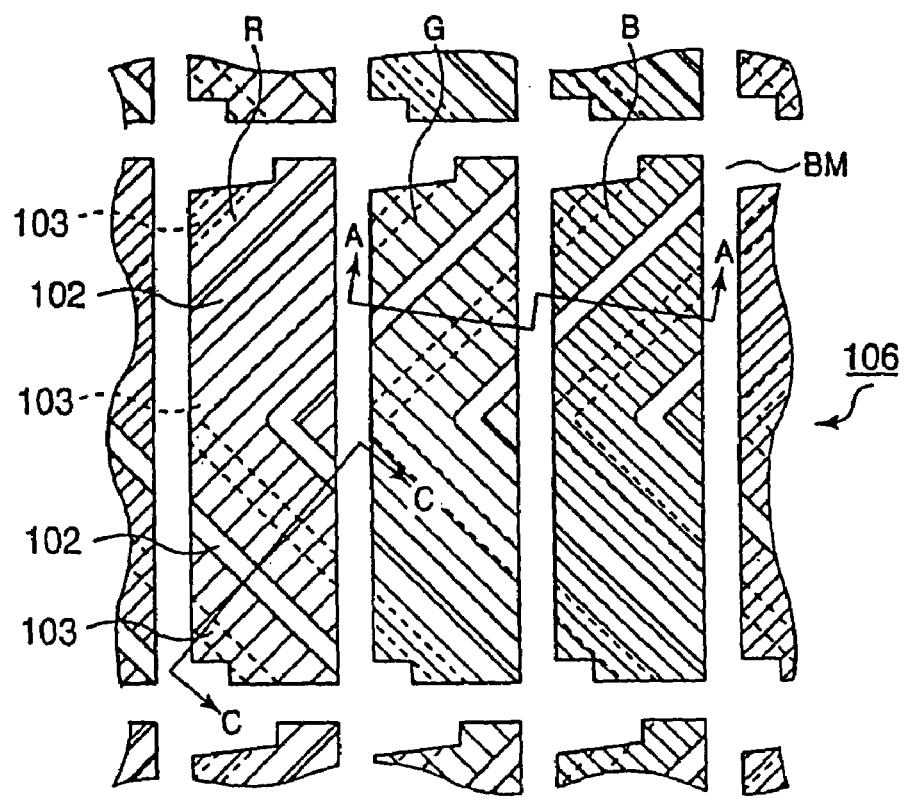
FIG. 35 is a plan view showing the configuration of a conventional substrate for a liquid crystal display device and the configuration of a liquid crystal display device using it.
Figure 36:
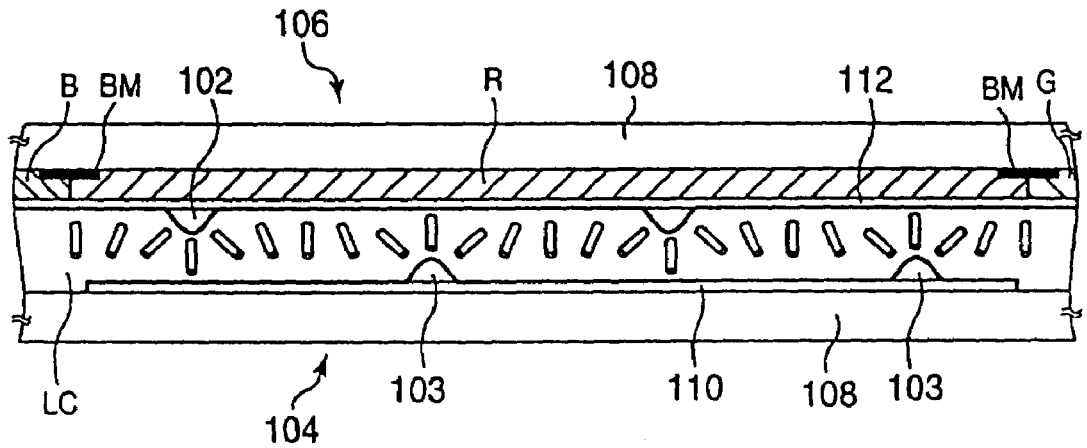
FIGS. 36 to 40 are sectional views showing the configurations of the conventional substrate for the liquid crystal display device and the liquid crystal display device using it.
Figure 37:
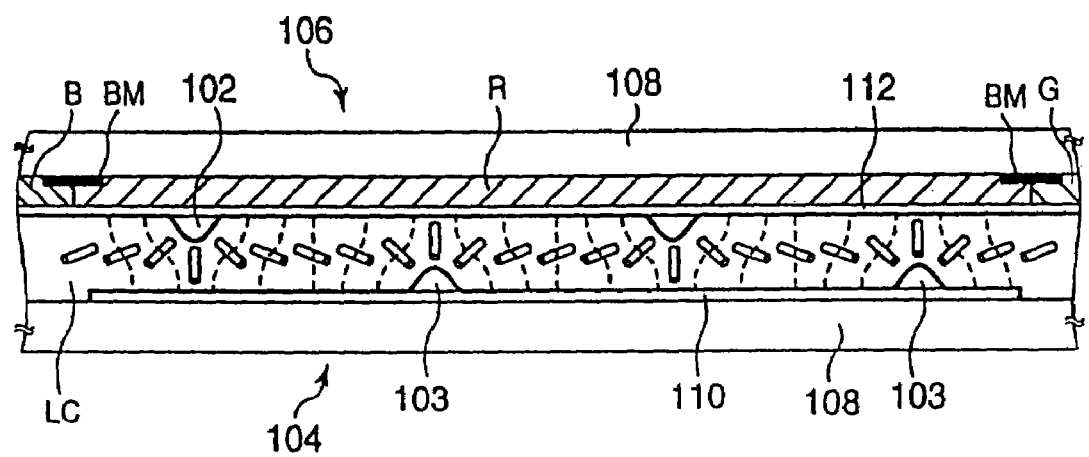
Figure 38:
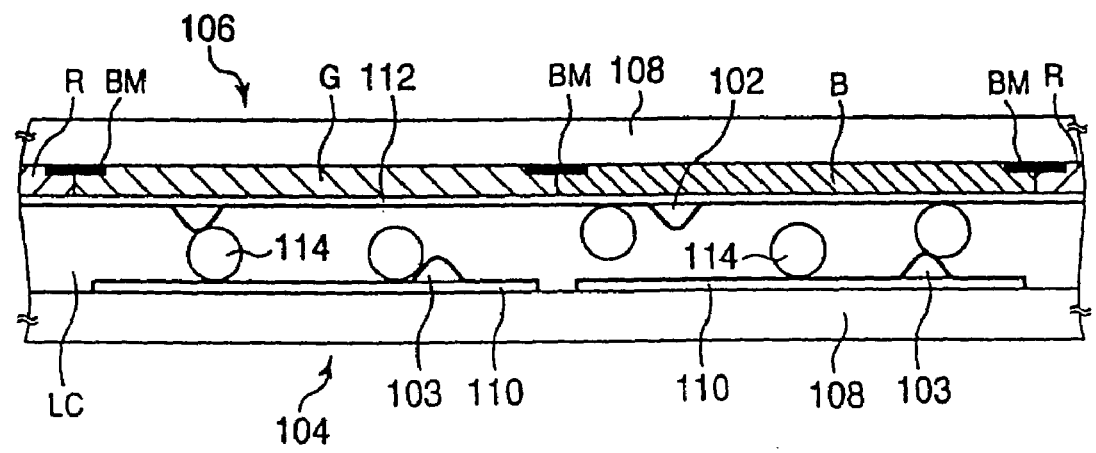
Figure 39:
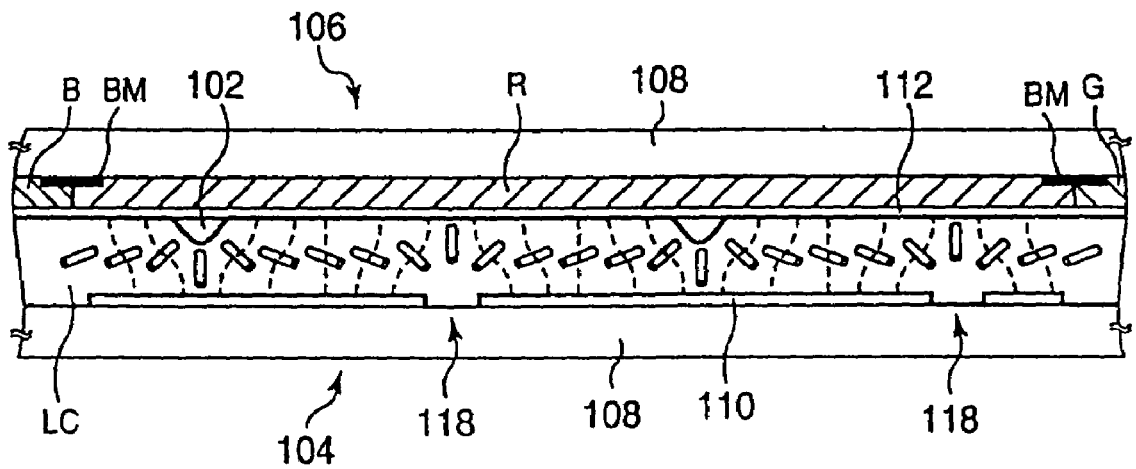
Figure 40:
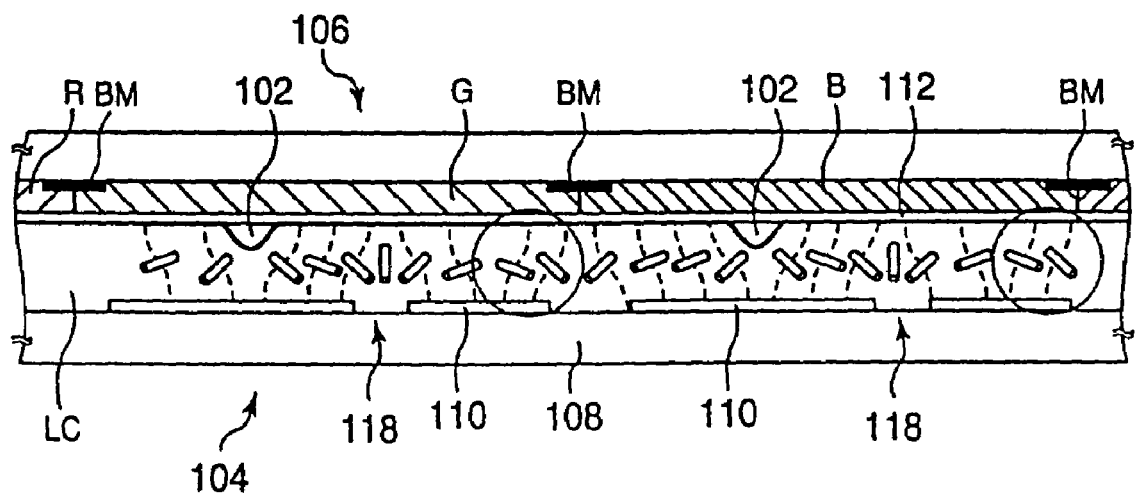
Figure 41:
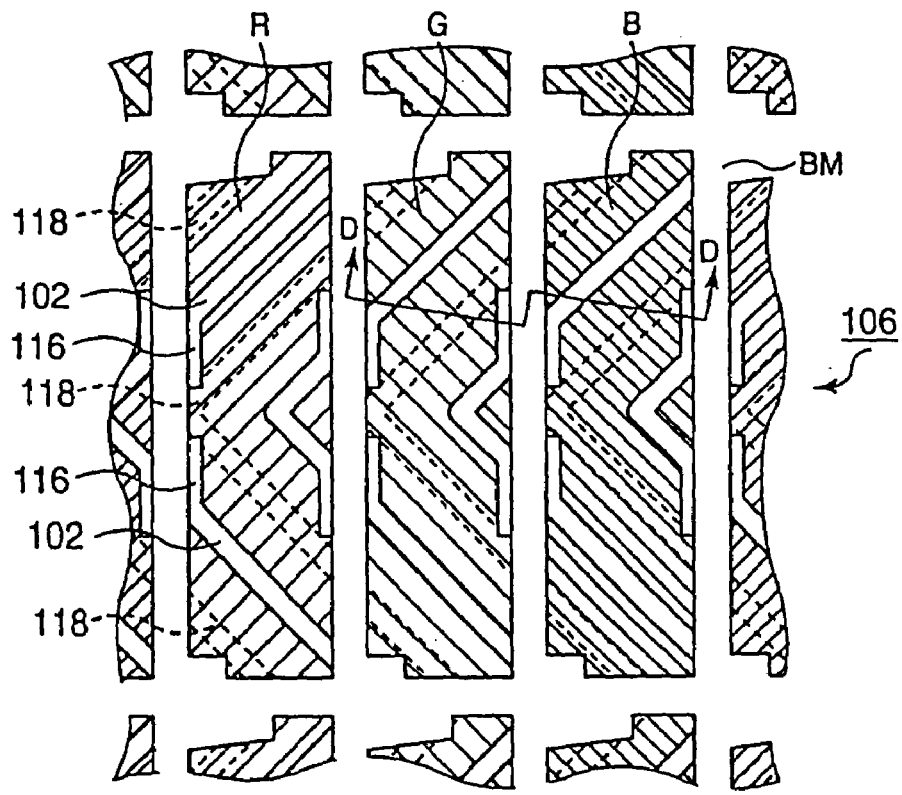
FIG. 41 is a plan view showing the configuration of still another conventional substrate for a liquid crystal display device and the configuration of a liquid crystal display device using it.

FIG. 34 shows, in such a manner as to be correlated with FIG. 33, substrate surfaces that are obtained after resist patterning.

In the light shield patterns (A) to (E) of FIG. 33, the pattern formation width varies from 8 μm to 2 μm. The resolution limit under ordinary conditions of photolithography using the exposure machine of this example is about 4 μm. Therefore, it can be said that the dummy test patterns 66 shown in FIG. 33 are formed by using an exposure mask whose pattern formation widths are close to the resolution limit under ordinary photography conditions.

Incidentally, the pattern resolution limit depends on the resist film thickness, the pre-baking conditions, the exposure conditions, and development conditions. A description will now be made of what shapes the dummy test patterns 66 that are formed from a resist film concerned assume after development for different values of the thickness T of the resist film.

As shown in row (a) of FIG. 33, when the application thickness T of the resist film is equal or close to 3 μm, developed dummy test patterns 66 have sizes that approximately conform to the pattern widths of the respective light shield patterns (A) to (C) that are greater than or equal to the resolution limit (4 μm). Therefore, as shown in part (a) of FIG. 34, dummy test patterns 66 are formed whose sizes approximately coincide with the outline sizes of the respective light shield patterns (A) to (C) when viewed perpendicular to the substrate surface.

On the other hand, for the light shield patterns (D) and (E) whose widths are smaller than the resolution limit (4 μm), no patterns remain because also the intended light shield regions are exposed to light due to the light diffraction.

Next, a description will be made of a case where the application thickness T of the resist film is smaller than 3 μm (see row (b) of FIG. 33). In this case, for the light shield patterns (A) and (B) whose widths exceed the resolution limit, developed dummy test patterns 66 have sizes that are smaller than the respective light shield pattern widths because of overexposure. Therefore, as shown in part (b) of FIG. 34, dummy test patterns 66 are formed that are a size smaller than the outlines of the respective light shield patterns (A) and (B) when viewed perpendicular to the substrate surface.

For the light shield pattern (C) whose width approximately coincides with the resolution limit, a developed dummy pattern 66 is formed that is smaller and thinner than in the ordinary case because of overexposure plus a phenomenon that also the intended light shield portion is exposed to light weakly due to the light diffraction. Therefore, as shown in part (c) of FIG. 34, an approximately circular dummy test pattern 66 is formed that is much smaller than the outline of the light shield pattern (C) when viewed perpendicular to the substrate surface.

On the other hand, for the light shield patterns (D) and (E) whose widths are smaller than the resolution limit (4 μm), no patterns remain because also the intended light shield regions are exposed to light due to the light diffraction.

As a result, when the thickness distribution of the resin spacers 54 have unevenness and the thickness in the uneven thickness region is smaller than the ordinary thickness (T=3 μm), the dummy test patterns 66 in the vicinity of the resin spacers 54 in the uneven thickness region are smaller than in the ordinary thickness region when viewed perpendicular to the substrate surface or no dummy test patterns 66 are formed at all.

Next, a description will be made of a case where the application thickness T of the resist film is greater than 3 μm (see row (c) of FIG. 33). In this case, for the light shield patterns (A) to (C) whose widths are greater than or equal to the resolution limit, developed dummy test patterns 66 have sizes that are greater than the respective light shield pattern widths because underexposure occurs basically. Therefore, as shown in part (c) of FIG. 34, dummy test patterns 66 are formed that are a size larger than the outlines of the respective light shield patterns (A) to (C) when viewed perpendicular to the substrate surface.

On the other hand, for the light shield patterns (D) and (E) whose widths are smaller than the resolution limit, a pattern having small thickness values remains because portions that would be exposed to light in the ordinary thickness are given only less-than-necessary exposure amounts.

As a result, when the thickness distribution of the resin spacers 54 have unevenness and the thickness in the uneven thickness region is greater than the ordinary thickness (T=3 μm), the dummy test patterns 66 in the vicinity of the resin spacers 54 in the uneven thickness region is larger than in the ordinary thickness region when viewed perpendicular to the substrate surface or dummy test patterns 66 remains even in the case where patterns disappears if the thickness is the ordinary value. It is noted that if the thickness T of the resist film becomes even greater, thin-film patterns come to remain even between the dummy test patterns 66 because of insufficient exposure amounts.

As described above, if there is a local thickness variation (thickness unevenness), the size of dummy test patterns 66 in the vicinity of the resin spacers 54 greatly varies there in accordance with the varied thickness. Therefore, the thickness relative to the ordinary thickness (reference thickness) can easily be checked merely by observing, with a microscope or the like, the dummy test patterns 66 in the vicinity of the resin spacers 54 in a region where thickness unevenness occurs. In particular, it is possible to automatically judge for a spacer thickness defect using image processing based on the fact that differences in pattern shape are remarkable for resist thickness values that are smaller than or equal to the resolution limit.

In the testing step, first, the CF substrate 56 in which the resin spacers 54 and the dummy patterns 64 were formed in the spacer forming step is visually inspected under illumination by a high-intensity lamp and it is checked whether a plurality of resin spacers 54 have thickness unevenness. If thickness unevenness is found, a variation in the size of the dummy test patterns 66 in the vicinity of the resin spacers 54 is observed with the above-mentioned microscope or image processing testing apparatus (not shown), whereby the thickness relative to the reference thickness is recognized.

As for a substrate in which thickness unevenness of the resin spacers 54 was found, a recognition result as to the thickness of the resin spacers 54 is referred to and the resin spacers 54 and the dummy patterns 64 are removed by peeling using a resist stripper, for example. The substrate is moved to the step of forming resin spacers 54 again by the recovery process.

A CF substrate 56 in which no thickness unevenness of the resin spacers 54 was found is calcined in a clean oven, whereby the resin spacers 54 are completed.

Alignment films (not shown) are formed on the opposite surfaces of the CF substrate 56 thus formed and an array substrate 60, a liquid crystal is sealed in a cell formed by attaching together the two substrates 56 and 60, and finally polarizers are attached with a resulting panel, whereby a liquid crystal display device is completed.

According to this embodiment, since the dummy test patterns 66 are formed in the vicinity of the resin spacers 54 through exposure that is performed with mask pattern widths that are close to the resolution limit under ordinary process conditions, thickness differences can easily be detected based on the shapes of developed dummy test patterns 66 without need for measuring the thickness directly with a contact type film thickness meter or the like. By measuring, in advance, through measurements, a relationship between the thickness of resin spacers 54 and the shape of dummy test patterns 66 as viewed perpendicular to the substrate surface, the thickness of resin spacers 54 formed can be recognized based on the shapes of the dummy test patterns 66 formed.

According to the second basic embodiment, even if thickness unevenness occurs in the resin spacer forming step due to application unevenness or the like, the thickness unevenness can be found after development of the resin spacers 54. Therefore, the resin spacer 54 peeling step enables recovery of the CF substrate 56 concerned, whereby the panel yield is increased and the manufacturing cost can be reduced accordingly. Further, forming the dummy test patterns 66 makes it possible to easily check the relative thickness through mere observation with a microscope or the like, that is, without need for measuring the thickness directly.

As described above, the invention can realize a liquid crystal display device capable of obtaining high luminance and good display characteristics, a substrate for such a liquid crystal display device, and a manufacturing method of such a substrate.

What is claimed is:

1. A substrate for a liquid crystal display device, comprising:
   an insulating substrate for holding a liquid crystal between the insulating substrate itself and an opposite substrate;
   a plurality of resin spacers formed adjacent the insulating substrate, for regulating a cell thickness; and
   a plurality of dummy patterns made of the same material as the resin spacers formed adjacent the insulating substrate in such a manner that top surfaces of the dummy patterns are lower than those of the resin spacers;
   wherein base surfaces of the resin spacers are higher than those of the dummy patterns, and
   further wherein heights of the resin spacers are approximately equal to heights of the dummy patterns.

2. The substrate for the liquid crystal display device according to claim 1, wherein a total area of the resin spacers and the dummy patterns as viewed perpendicular to a surface of the substrate is 10% or more of an area of a display area.

3. A substrate for a liquid crystal display device according to claim 1, wherein a value of d1–d2 is approximately 1 μm, where d1 is a distance between a common electrode and the top surfaces of the resin spacers and d2 is a distance between the common electrode and the top surfaces of the dummy patterns.

4. A substrate for a liquid crystal display device, comprising:
   an insulating substrate for holding a liquid crystal between the insulating substrate itself and an opposite substrate;

a plurality of resin spacers formed adjacent the insulating substrate, for regulating a cell thickness;

a plurality of dummy patterns made of the same material as the resin spacers formed adjacent the insulating substrate in such a manner that top surfaces of the dummy patterns are lower than those of the resin spacers, wherein base surfaces of the resin spacers are higher than those of the dummy patterns;

color filters formed between the insulating substrate and the resin spacers and disposed in such regions as to be opposed to respective pixel electrodes formed on the opposite substrate; and a light shield film formed between the insulating substrate and the resin spacers and disposed in a region excluding the regions to be opposed to the respective pixel electrodes.

5. The substrate for the liquid crystal display device according to claim 4, wherein the dummy patterns are formed on the light shield film.

6. The substrate for the liquid crystal display device according to claim 4, further comprising dummy test patterns formed adjacent the light shield film and having a smaller area than the dummy patterns when viewed perpendicular to a surface of the substrate.

7. A liquid crystal display device comprising an array substrate having pixel regions that are defined by a plurality of bus lines intersecting alternately, a color filter substrate arranged opposite to the array substrate and having color filter in each of the pixel regions, and a liquid crystal sealed between the array substrate and the color filter substrate;

wherein either the color filter substrate or the array substrate includes:

an insulating substrate for holding a liquid crystal between the insulating substrate itself and an opposite substrate;

a plurality of resin spacers formed adjacent the insulating substrate, for regulating a cell thickness; and a plurality of dummy patterns made of the same material as the resin spacers formed adjacent the insulating substrate in such a manner that top surfaces of the dummy patterns are lower than those of the resin spacers;

wherein base surfaces of the resin spacers are higher than those of the dummy patterns, and further wherein heights of the resin spacers are approximately equal to heights of the dummy patterns.

8. A substrate for a liquid crystal display device, comprising:

an insulating substrate for holding a liquid crystal between the insulating substrate itself and an opposite substrate;

a plurality of resin spacers formed adjacent the insulating substrate, for regulating a cell thickness; and a plurality of dummy patterns made of the same material as the resin spacers formed adjacent the insulating substrate in such a manner that top surfaces of the dummy patterns are lower than those of the resin spacers;

wherein base surfaces of the resin spacers are higher than those of the dummy patterns;

further comprising dummy test patterns formed adjacent the insulating substrate and having a smaller area than the dummy patterns when viewed perpendicular to a surface of the substrate.

9. The substrate for the liquid crystal display device according to claim 8, wherein the dummy test patterns are made of the same material as the resin spacers.

10. The substrate for the liquid crystal display device according to claim 9, wherein the material of the resin spacers is a novolak resin type photosensitive photoresist.

11. The substrate for the liquid crystal display device according to claim 8, wherein the dummy test patterns are formed by using an exposure mask having a pattern formation width that is close to a resolution limit.

12. The substrate for the liquid crystal display device according to claim 11, wherein the pattern formation width is in a range of 2 μm to 8 μm.

* * * * *